United States Patent
Bohlscheid et al.

(10) Patent No.: US 12,439,938 B1
(45) Date of Patent: *Oct. 14, 2025

(54) POTATO PROTEIN POWDERS

(71) Applicant: J.R. Simplot Company, Boise, ID (US)

(72) Inventors: Jeffri Curtis Bohlscheid, Boise, ID (US); Katrina Marie Fletcher, Palmerston North (NZ); Lee Meryl Huffman, Palmerston North (NZ)

(73) Assignee: J.R. Simplot Company, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/247,275

(22) Filed: Jun. 24, 2025

Related U.S. Application Data

(63) Continuation of application No. 15/940,705, filed on Mar. 29, 2018, now Pat. No. 12,376,607.

(60) Provisional application No. 62/479,998, filed on Mar. 31, 2017.

(51) Int. Cl.
| | |
|---|---|
| A23J 3/14 | (2006.01) |
| A23C 9/13 | (2006.01) |
| A23C 11/06 | (2006.01) |
| A23C 11/10 | (2021.01) |
| A23J 1/00 | (2006.01) |
| A23L 2/66 | (2006.01) |
| A23L 11/30 | (2016.01) |
| A23L 19/15 | (2016.01) |
| A23L 33/185 | (2016.01) |

(52) U.S. Cl.
CPC ............... *A23J 3/14* (2013.01); *A23C 9/1315* (2013.01); *A23C 11/06* (2013.01); *A23C 11/10* (2013.01); *A23J 1/006* (2013.01); *A23L 2/66* (2013.01); *A23L 11/34* (2016.08); *A23L 19/15* (2016.08); *A23L 33/185* (2016.08); *A23V 2250/548* (2013.01); *A23V 2300/10* (2013.01)

(58) Field of Classification Search
CPC ........................................................ A23J 3/14
See application file for complete search history.

(56) References Cited

U.S. PATENT DOCUMENTS

| | | | |
|---|---|---|---|
| 4,234,620 | A | 11/1980 | Howard et al. |
| 4,734,287 | A | 3/1988 | Singer et al. |
| 5,997,652 | A | 12/1999 | Potter et al. |
| 6,414,124 | B1 | 7/2002 | Ryan et al. |
| 6,686,456 | B2 | 2/2004 | Ausich et al. |
| 6,800,319 | B1 | 10/2004 | Hulst et al. |

(Continued)

FOREIGN PATENT DOCUMENTS

| | | |
|---|---|---|
| DE | 19800335 A1 | 7/1999 |
| DE | 102007012439 A1 | 9/2008 |

(Continued)

OTHER PUBLICATIONS

Examination Report for New Zealand Application No. 757336, mailed Apr. 7, 2025.

(Continued)

*Primary Examiner* — Elizabeth Gwartney
(74) *Attorney, Agent, or Firm* — Cooley LLP

(57) ABSTRACT

Methods for making wettable, dispersible potato protein powders are provided. The wettable dispersible potato protein powders comprise potato protein, free amino acids, non-protein nitrogen compounds, and minerals from potatoes; and are low in total α-glycoalkaloids. The inventive potato protein powders are suitable for use in formulating foods, feeds and beverages.

20 Claims, 8 Drawing Sheets

(56) References Cited

U.S. PATENT DOCUMENTS

| | | |
|---|---|---|
| 6,872,544 B2 | 3/2005 | Stomp et al. |
| 6,936,109 B2 | 8/2005 | Grull et al. |
| 7,108,881 B2 | 9/2006 | Akashe et al. |
| 7,186,807 B2 | 3/2007 | Salome et al. |
| 7,371,418 B2 | 5/2008 | Sheabar et al. |
| 7,399,495 B2 | 7/2008 | Monagle et al. |
| 7,465,398 B1 | 12/2008 | Robert et al. |
| 7,531,086 B2 | 5/2009 | Benesi et al. |
| 7,651,619 B2 | 1/2010 | Hansen et al. |
| 7,956,166 B2 | 6/2011 | Lihme et al. |
| 8,293,316 B2 | 10/2012 | Castillo et al. |
| 8,293,317 B2 | 10/2012 | Fannon et al. |
| 8,313,788 B2 | 11/2012 | Licker et al. |
| 8,377,877 B2 | 2/2013 | Ausich et al. |
| 8,465,911 B2 | 6/2013 | Giuseppin et al. |
| 8,486,481 B2 | 7/2013 | Giuseppin et al. |
| 8,642,109 B2 | 2/2014 | Baumer et al. |
| 8,691,318 B2 | 4/2014 | Schweizer et al. |
| 8,821,956 B2 | 9/2014 | Giuseppin et al. |
| 8,889,209 B2 | 11/2014 | Kruesemann et al. |
| 9,005,685 B2 | 4/2015 | Cotton et al. |
| 9,034,402 B2 | 5/2015 | Wong et al. |
| 9,102,749 B2 | 8/2015 | Giuseppin et al. |
| 9,238,045 B2 | 1/2016 | Ivie |
| 9,247,767 B2 | 2/2016 | Hathuc et al. |
| 9,480,277 B2 | 11/2016 | Giuseppin et al. |
| 9,526,266 B2 | 12/2016 | Giuseppin et al. |
| 9,925,496 B2 | 3/2018 | Medoff et al. |
| 12,376,607 B2 | 8/2025 | Bohlscheid et al. |
| 2001/0041199 A1 | 11/2001 | Davids |
| 2004/0089601 A1 | 5/2004 | Strohm et al. |
| 2008/0226781 A1 | 9/2008 | Lotz et al. |
| 2010/0003394 A1 | 1/2010 | Giuseppin et al. |
| 2010/0036090 A1 | 2/2010 | Giuseppin et al. |
| 2010/0040591 A1 | 2/2010 | Giuseppin et al. |
| 2010/0048873 A1 | 2/2010 | Lotz et al. |
| 2010/0087628 A1 | 4/2010 | Lihme et al. |
| 2010/0105871 A1 | 4/2010 | Giuseppin et al. |
| 2010/0136202 A1 | 6/2010 | Van Hooff et al. |
| 2010/0195871 A1 | 8/2010 | Simon |
| 2011/0003975 A1 | 1/2011 | Arase et al. |
| 2011/0097448 A1 | 4/2011 | Wong et al. |
| 2011/0217436 A1 | 9/2011 | Klijnstra et al. |
| 2011/0236545 A1 | 9/2011 | Brown et al. |
| 2011/0305740 A1 | 12/2011 | Boursier et al. |
| 2011/0311599 A1 | 12/2011 | Boursier et al. |
| 2012/0128832 A1 | 5/2012 | Smith |
| 2013/0017310 A1 | 1/2013 | Dhalleine et al. |
| 2013/0023480 A1 | 1/2013 | Schasteen et al. |
| 2014/0141127 A1 | 5/2014 | Jincks et al. |
| 2014/0161929 A1 | 6/2014 | Briegleb et al. |
| 2014/0161958 A1 | 6/2014 | Brackenridge et al. |
| 2014/0272094 A1 | 9/2014 | Joh et al. |
| 2015/0056346 A1 | 2/2015 | Margolis |
| 2015/0140618 A1 | 5/2015 | Spelbrink et al. |
| 2015/0183840 A1 | 7/2015 | Giuseppin et al. |
| 2015/0257417 A1 | 9/2015 | Woll et al. |
| 2016/0050950 A1 | 2/2016 | Schmitt et al. |
| 2016/0135489 A1 | 5/2016 | Batenburg et al. |
| 2016/0255848 A1 | 9/2016 | Mikkelsen et al. |
| 2016/0262412 A1 | 9/2016 | Pedersen et al. |
| 2016/0262424 A1 | 9/2016 | Mikkelsen et al. |
| 2016/0278403 A1 | 9/2016 | Rodriguez |
| 2016/0309732 A1 | 10/2016 | Gugger et al. |
| 2016/0309755 A1 | 10/2016 | Wearly et al. |
| 2017/0055541 A1 | 3/2017 | Giuseppin et al. |
| 2017/0150734 A1 | 6/2017 | Lorand et al. |
| 2017/0196243 A1 | 7/2017 | Baxter et al. |
| 2017/0251704 A1 | 9/2017 | Giuseppin et al. |
| 2017/0258123 A1 | 9/2017 | Redl et al. |
| 2017/0303558 A1 | 10/2017 | Eisner et al. |
| 2018/0042263 A1 | 2/2018 | Christensen et al. |
| 2018/0042265 A1 | 2/2018 | Johansson et al. |
| 2018/0056244 A1 | 3/2018 | Vogel et al. |
| 2018/0064155 A1 | 3/2018 | Chawla et al. |
| 2018/0289036 A1 | 10/2018 | Bohlscheid et al. |

FOREIGN PATENT DOCUMENTS

| | | |
|---|---|---|
| EP | 2086356 B1 | 6/2010 |
| EP | 2083636 B1 | 9/2013 |
| EP | 3027055 B1 | 2/2017 |
| WO | WO-9117665 A1 | 11/1991 |
| WO | WO-9703571 A1 | 2/1997 |
| WO | WO-9742834 A1 | 11/1997 |
| WO | WO-02100187 A1 | 12/2002 |
| WO | WO-2004049785 A1 | 6/2004 |
| WO | WO-2008006951 A1 | 1/2008 |
| WO | WO-2008056977 A1 | 5/2008 |
| WO | WO-2008069650 A1 | 6/2008 |
| WO | WO-2008069651 A1 | 6/2008 |
| WO | WO-2008092450 A1 | 8/2008 |
| WO | WO-2008118016 A1 | 10/2008 |
| WO | WO-2009065724 A1 | 5/2009 |
| WO | WO-2009092337 A1 | 7/2009 |
| WO | WO-2011059330 A1 | 5/2011 |
| WO | WO-2014011042 A1 | 1/2014 |
| WO | WO-2016036243 A1 | 3/2016 |
| WO | WO-2016063101 A1 | 4/2016 |
| WO | WO-2016133448 A1 | 8/2016 |
| WO | WO-2016164096 A1 | 10/2016 |
| WO | WO-2017021428 A1 | 2/2017 |
| WO | WO-2017021431 A1 | 2/2017 |
| WO | WO-2017037345 A1 | 3/2017 |
| WO | WO-2017078530 A1 | 5/2017 |
| WO | WO-2017142406 A1 | 8/2017 |
| WO | WO-2017146568 A1 | 8/2017 |
| WO | WO-2017150973 A1 | 9/2017 |
| WO | WO-2018082759 A1 | 5/2018 |
| WO | WO-2018183770 A1 | 10/2018 |

OTHER PUBLICATIONS

Examination Report for New Zealand Application No. 798625, mailed Apr. 8, 2025.

A basic guide to particle characterization. Malvern Instruments Limited (2015), Whitepaper, 24 pages. https://www.malvernpanalytical.com/en/learn/knowledge-center/Whitepapers/WP120620BasicGuidePartChar.html?gclid=EAlaIQobChMIkla-_87B2glVhchkCh3hpARVEAAYASAAEgly8_D_BwE.

"A Guidebook to Particle Size Analysis." Horiba Scientific (2017); 34 pages, https://www.horiba.com/fileadmin/uploads/Scientific/.../PSA/PSA_Guidebook.pdf.

Annex 9 "A rework of Dabestani experiment 3", Mar. 10, 2021, pp. 1-2.

Augustin., M.A., et al., "Dry Milk Ingredients," In Chandan & Kilara, eds. Dairy Ingredients for Food Processing (2011), Chapter 6, pp. 141-159.

[Author Unknown] "A rework of Edens' example 1", Mar. 9, 2021, 2 pages.

[Author Unknown] AOAC Official Method 990.19 Solids (Total) in Milk By Forced Air Oven Drying after Steam Table Predry (First Action 1990, Final Action 1993), 33.2.43, 1 page.

[Author Unknown] "Compositional details of LMW products", Mar. 1, 20210, 1 page.

[Author Unknown] FAO Food and Nutrition Paper 77, Chapter 2: Methods of Food Analysis, Food energy—methods of analysis and conversion factors, Report of a Technical Workshop, Rome, Dec. 3-6, 2002, 9 pages, Food and Agriculture Organization of the United Nations, Rome, 003, http://www.fao.orq/docrep/006/Y5022E/y5022e03.htm.

[Author Unknown] "Microparticulation" (undated common general knowledge), GEA Group Aktiengesellschaft, https://www.gea.com/en/products/liquid-processing/microparticulation/Index.jsp, downloaded Oct. 11, 2021, 6 pages.

[Author Unknown] "Solanic potato protein wins CFIA food innovation award", Innovations in Food Technology (May 2008); www.innovfoodtech.com, 1 page.

(56) References Cited

OTHER PUBLICATIONS

[Author Unknown] "Protein quality evaluation." FAO Food and Nutrition Paper 51, Report of the Joint FAO/WHO, Expert Consultation, Bethesda, MD, USA, Dec. 4-8, 1989, 72 Pages.
[Author Unknown] "Q&A With With Dr Jocelyn Midgley, R&D Manager, Simplot Australia". Published Apr. 26, 2017 at https://www.facebook.com/atfmUNSW/posts/jocelyn-midgley-is-rd-manager-withone-of-australias-largest-food-manufacturers-/257595291315891 /, downloaded Nov. 19, 2021 at https://www.atfm.unsw.edu.au/qa-with-with-dr-jocelyn-midgely-rd-manager-simplotaustralia/?fbclid=IWAR3sZtqU8Ms2XfLnT20Jsl3kgAF6XV3TH82MOtidqU4tbPBC-Gx 6iUimFs, 5 pages.
Beran., M., et al., "Pilot-scale Production and Application of Microparticulated Plant Proteins," Journal of Nutrition & Food Sciences, 2018, vol. 8(1), 8 Pages.
Brown, "5 Ways to Eat Greek Yogurt", Jun. 1, 2012, Muscle & Performance, pp. 1-4.
Bártová et al., "Chemical Composition and Nutritional Value of Protein Concentrates Isolated from Potato (Solanum tuberosum L.) Fruit Juice by Precipitation with Ethanol or Ferric Chloride". J. Agric. Food Chem. (Oct. 14, 2009); 57(19): 9028-9034.
Budslawski et al., "Determination of Proteins and Nitrogen Compounds," Food Analysis Methods, 1972, pp. 214-237, with machine translation.
Dabestani, S et al., "Protein Recovery From Potato Processing Water: Pre-treatment and Membrane Fouling Minimization," Journal of Food Engineering, 2017, pp. 85-96.
Dabestani, Shirin Sadat., "Protein Recovery from Potato Processing Effluent Stream Using Ultrafiltration Membrane: Laboratory and pilot studies on membrane fouling mitigation and protein quality." Thesis, Mar. 2017, School of Chemical Engineering, The University of New South Wales, Australia, 201 pages.
EPO Communication dated Apr. 23, 2021 transmitting Third Party Observations filed Apr. 19, 2021, in European Patent Application No. 18777004.5, 285 pages.
EPO Communication dated Nov. 16, 2021 transmitting Third Party Observations filed Nov. 9, 2021, in European Patent Application No. 18777004.5, 121 pages.
Erdman, Jr., "The quality of microparticulated protein". J. Am. Coli. Nutr. (Aug. 1990); 9(4): 398-409. (Abstract).
Extended European Search Report in European Patent Application No. 18777004.5, dated Jan. 19, 2021, 9 pages.
Final Office Action for U.S. Appl. No. 15/940,705, dated Jan. 18, 2023, 12 pages.
Final Office Action for U.S. Appl. No. 15/940,705 dated Jan. 25, 2022, 8 pages.
Final Office Action for U.S. Appl. No. 15/940,705 mailed Feb. 5, 2025, 15 pages.
Food and Agriculture Organization of the United Nations, "Food energy—methods of analysis and conversion factors." FAO Food and Nutrition Paper 77. Report of a Technical Workshop, Rome, Dec. 3-6, 2002, 58 pages, retrieved from URL:https://www.fao.org/4/y5022e/y5022e00.htm,.
Food and Agriculture Organization of the United Nations, "Protein quality evaluation." Report of Joint FAO/WHO Expert Consultation, Bethesda, MD, USA Dec. 4-8, 1989 , FAO Food and Nutrition (1991); Paper 51, Rome, 72 pages.
Graf, et al., "[Downstream processing with membrane adsorbers for the isolation of native protein fractions from potato fruit water] Downstream-Processing mit Membranadsorbern zur Isolierung nativer Proteinfraktionen aus Kartoffelfruchtwasser", [Chemie Ingenieur Technik (Mar. 2009); 81(3): 267-274.
GRAS Submission, "GRAS Exemption Claim for Potato Protein Isolates." GRN Notice No. 447 by Solanic B.V., an AVEBE group Company, dated Aug. 10, 2012, filed with and received by the Center for Food Safety and Applied Nutrition, Food and Drug Administration on Oct. 18, 2012, 89 pages, Retrieved from the Internet: URL: http://www.fda.gov/downloads/Food/IngredientsPackagingLabeling/GRAS/Noticeinvent ory/UCM337463 [retrieved on Jan. 15, 2016].
GRAS Submission No. 86 by Avebe b.a., dated Oct. 19, 2001, filed with and received by the Center for Food Safety and Applied Nutrition, Food and Drug Administration on Oct. 22, 2001, entitled "GRAS Notification for Coagulated Potato Protein", 25 pages.
Halford, et al., "Concentrations of Free Amino Acids and Sugars in Nine Potato Varieties: Effects of Storage and Relationship with Acrylamide Formation", J. Agric. Food Chem. (Nov. 3, 2012); 60(48): 12044-12055, and Supporting Information.
He, et al., "Digestion kinetics of potato protein isolates in vitro and in vivo", Int J Food Sci Nutr. (Nov. 2013); 64(7): 787-793. Epub May 28, 2013.
Horinka, "Powder particle size: Measurement and communication." Powder Coating (Jun. 1995); pp. 69-76.
International Preliminary Report on Patentability, International Application No. PCT/US2018/025288, mailed Oct. 1, 2019, 14 pages.
International Search Report and Written Opinion for International Application No. PCT/US2018/025288,, mailed Jul. 31, 2018, 23 pages.
Invitation to Pay Additional Fees International Application No. PCT/US2018/025288, mailed Jun. 5, 2018, 2 pages.
Kalab., M., et al., "Microparticulate protein in foods," Journal of the American College of Nutrition, Aug. 1, 1990, vol. 9(4), pp. 374-387.
Korpan, et al., "Potato glycoalkaloids: true safety or false sense of security?", Trends Biotechnol. (Mar. 2004); 22(3): 147-151.
Labib, A.I., "Potato Proteins Their Properties and Nutritive Value", Agricultural University of Wageningen, The Netherlands, Thesis, M.Sc., Cairo University, Jun. 8, 1962, pp. 55-57, 60-62; 11 pages.
Laus, et al., "Improved Extraction and Sample Cleanup of Triglycoalkaloids a-Solanine and a-Chaconine in Non-denatured Potato Protein Isolates", Food Analytical Methods (2017); 10: 845-853, 11 pages. Published Sep. 3, 2016.
Lokra and Straetkvern, "Industrial Proteins from Potato Juice. A Review", Food (2009); 3 (Special Issue 1): 88-95.
Maga and Fitzpatrick, "Potato glycoalkaloids", Critical Reviews in Food Science & Nutrition (1980), 12(4): 371-405. Epub Sep. 29, 2009.
Marais et al., "The use of trichloroacetic acid as a precipitant for the determination of 'true protein' in animal feeds," S. Afr. J. Anim. Sci. 13(2), 1983, pp. 138-139.
Millward, Joe D., "Amino acid scoring patterns for protein quality assessment." British Journal of Nutrition (2012); 108 (S2): S31-S43.
Non-Final Office Action for U.S. Appl. No. 15/940,705 dated Aug. 27, 2020, 9 pages.
Non-Final Office Action for U.S. Appl. No. 15/940,705 dated Jul. 13, 2022, 11 pages.
Non-Final Office Action for U.S. Appl. No. 15/940,705 dated May 25, 2021, 7 pages.
Non-Final Office Action for U.S. Appl. No. 15/940,705 dated May 9, 2024, 12 pages.
Office Action for Canadian Application No. 3055986 mailed Oct. 12, 2023, 8 pages.
Office Action for European Application No. 18777004.5, dated Feb. 15, 2024, 6 pages.
Office Action issued by the Argentina Patent Office for Application No. P180100813, issued by the Examiner on May 9, 2022, published in Gazette Jun. 15, 2022, 4 pages, with English translation.
Office Action issued by the Argentina Patent Office for Application No. P180100813, issued by the Examiner on Sep. 6, 2021, published in Gazette Sep. 22, 2021, 7 pages, with English translation.
Office Action issued by the Australian Patent Office for Application No. 2018243407, issued on Mar. 23, 2023, 6 pages.
Office Action issued by the Taiwanese Patent Office for Application No. 107111473, issued on Mar. 28, 2019, 19 pages, with English translation.
Reply Brief (Machine translation) and amended claims (English translation) in Argentine Patent Application No. P180100813 filed Nov. 9, 2022, 19 pages.

(56) References Cited

OTHER PUBLICATIONS

Reply to Argentinian Office Action for Argentinian Application No. P180100813, dated Feb. 18, 2022, 30 pages, with English translation.
Schmidt, Jesper Malling, PhD., "Purification and Functional Properties of Potato Protein Fractions." Thesis, Sep. 2016, Aarhus University—Foulum, Department of Food and Science, Denmark, 192 pages.
Sharma, et al., "Functionality of Milk Powders and Milk-Based Powders for End Use Applications—A Review." Comprehensive Reviews in Food Science and Food Safety (2012); 11(5): 518-528.
Singer., N.S., et al., "Protein Microparticulation: the principle and the process," Journal of the American College of Nutrition, Aug. 1, 1990, vol. 9(4), pp. 388-397.
Sirkulchayanont et al., "Characteristics of Microparticulated Particles from Mung Bean Protein", International Journal of Food Properties, 10, (2007), pp. 621-630.
Skindersoe, Berit, "Microparticulation of Whey Proteins- Applications in Dairy". Inofood EXP02011, Santiago—Chile, Nov. 23, 2011, 29 pages.
Tuohy, "Some Physical Properties of Milk Powders." Irish Journal of Food Science and Technology (1989); 13(2): 141-152.
U.S. Appl. No. 19/247,637, filed Jun. 24, 2025, by Bohlscheid et al.
Weller, "Whey versus Plant-Based Protein", Apr. 8, 2013, Ground-Based Nutrition, pp. 1-2.
Wojnowska et al., "Obtaining protein preparations from potato juice waters, and their characteristics," Acta Alimentaria Polonica, vol. V (XXIX), No. 3, 1979, pp. 227-237.
Wojnowska et al., "Processing of Potato Protein Concentrates and Their Properties", Journal of Food Science, vol. 47, (1981), pp. 167-172.
Young, V.R., et al., "Nutritional implications of microparticulated protein," Journal of the American College of Nutrition, Aug. 1, 1990, vol. 9(4), pp. 418-426.
Zhang, et al., "Comparative study of potato protein concentrates extracted using ammonium sulfate and isoelectric precipitation." International Journal of Food Properties (2017); 20 (9): 2113-2127.
Zwijnenberg, et al., "Native protein recovery from potato fruit juice by ultrafiltration", Desalination (Sep. 10, 2002); 144 (1-3): 331-334.

POTATO PROTEIN POWDERS

CROSS-REFERENCE TO RELATED APPLICATIONS

This application is a continuation of U.S. application Ser. No. 15/940,705, filed Mar. 29, 2018, now U.S. Pat. No. 12,376,607, issued Aug. 5, 2025, which claims the benefit of U.S. Provisional Application No. 62/479,998 filed on Mar. 31, 2017, which is hereby incorporated by reference in its entirety for all purposes.

FIELD OF THE INVENTION

The invention relates generally to methods of preparing potato protein powders, suitable for use in formulating foods, feeds and beverages.

BACKGROUND

Protein is a critical component of a complete and healthy diet. Protein is important for building and repairing tissues. It is also necessary for making enzymes, hormones, and other body chemicals that assist in building bones, muscles, cartilage, skin, and blood. The growing world population and decreasing amount of land under agricultural use requires new and plentiful sources of protein.

Nutritionists, doctors, and athletes, among others, recommend consuming protein to assist in maintaining health, building muscle and losing fat. Proteins can be found in various animal- and plant-based sources, products and by-products. Some widely used animal-based proteins are obtained directly or indirectly from meat, seafood, eggs, milk and cheese. Many people choose plant-based protein as opposed to dairy-based powders (whey or casein) due to lactose intolerance or sensitivity to dairy proteins. It is commonly known that many plant protein isolates naturally do not taste very good, nor do they behave well in liquids, thereby requiring a lot of food additives and/or industrial processing to make such plant-based proteins taste acceptable.

The present invention fulfills the need for more and different kinds of readily available and useful plant-based proteins, wherein such protein can be obtained in concentrated and isolated forms.

SUMMARY

The present invention relates to the production of novel potato protein powders which are useful as ingredients in edible compositions, such as in foods, feeds and beverages. In one aspect, the inventive potato protein powers are microparticulated. In another aspect, the inventive potato protein powders are more wettable than presently available protein powders. In another aspect, the inventive potato protein powders are functionalized.

In one aspect, the invention provides a potato protein powder comprising (a) crude protein extracted from potato fruit juice (PFJ) comprising: (i) 30-91 wt. % true protein; (ii) 1-30 wt. % free amino acids; and (b) 1-20 wt. % ash from the PFJ; wherein the total amino-acid score is equal to, or greater than 1 (AAS≥1). In another aspect, the invention provides a potato protein powder comprising (a) crude protein extracted from potato fruit juice (PFJ) comprising: (i) 30-91 wt. % true protein; (ii) 1-30 wt. % free amino acids; and (iii) 1-30 wt. % non-protein nitrogen and (b) 1-20 wt. % ash from the PFJ; wherein the total amino-acid score is equal to, or greater than 1 (AAS≥1). In another aspect, the invention provides a potato protein powder comprising (a) crude protein extracted from potato fruit juice (PFJ) comprising: (i) about 30 wt. % to about 91 wt. % true protein; (ii) about 1 wt. % to about 30 wt. % free amino acids; and (b) about 1 wt. % to about 20 wt. % ash from the PFJ; wherein the total amino-acid score is equal to, or greater than 1 (AAS≥1). In another aspect, the invention provides a potato protein powder comprising (a) crude protein extracted from potato fruit juice (PFJ) comprising: (i) 30-91 wt. % true protein; (ii) 1-30 wt. % free amino acids; and (iii) 1-30 wt. % non-protein nitrogen and (b) 1-20 wt. % ash from the PFJ; wherein the total amino-acid score is equal to, or greater than 1 (AAS≥1). In these and any other embodiment, the potato protein powder further comprises a potassium level of about 10,000-about 20,000 ppm, or about 20,000-about 30,000 ppm, or about 30,000-about 40,000 ppm, or about 40,000-about 50,000 ppm, or about 50,000-about 60,000 ppm, or more than 60,000 ppm. In this and any other embodiment, the potato protein powder further comprises about 19,000 ppm to about 50,000 ppm, or about 29,000 to about 50,000 ppm, or to about 58,000 ppm. In another embodiment, the potato protein powder comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, to about 92% crude protein. In another embodiment, the potato protein powder comprises free amino acids from about 5 wt. % to about 10 wt. %. In another embodiment, the potato protein powder comprises a total α-glycoalkaloid concentration of less than 300 ppm, or less than 200 ppm, or less than 100 ppm, or less than 75 ppm, or less than 50 ppm. In another embodiment, at least one of the functional properties of the native potato proteins in the potato protein powder has been changed. In a further embodiment, the powder particle size (D[4,3]) of the reconstituted, microparticulated potato protein powder ranges from about 10 µm to about 100 µm. In another embodiment, the powder particle size ranges from 10-50 µm, or from 10-40 µm, or from 10-30 µm, or from 10-20 µm. In another embodiment, the reconstituted powder particle size (D[4,3]) is from about 10 µm to about 20 µm. In another embodiment, the microparticulated potato protein powder has a wettability of nearly 100% in less than 2 minutes when a mass of powder sufficient to prepare an aqueous 5% protein dispersion in 200 g is added to the surface of the water. In yet another embodiment, the microparticulated potato protein powder has a dispersibility of at least 90% when a mass of powder sufficient to prepare an aqueous 5% protein dispersion in 200 g is added to water and mixed for 1 minute. In one embodiment, there is an absence of syneresis in the finished product in a fermented food product comprising the native potato protein powder of the present invention.

In one embodiment, a ready to drink beverage or a dry mix beverage comprises the native potato protein powder of the present invention. In another embodiment, a ready to drink beverage or a dry mix beverage comprises the microparticulated potato protein powder. In a further embodiment, the beverage comprises at least one favorable sensory characteristic selected from the group comprising: appearance (e.g., color), flavor, aroma, and texture.

In one embodiment, a food, feed, or beverage comprises the native potato protein powder of the present invention. In another embodiment, a food, feed or beverage comprises the microparticulated potato protein powder of the present invention. In a further embodiment, the food, feed or beverage comprises at least one favorable sensory characteristic selected from the group comprising: appearance (e.g., color), flavor, aroma, and texture. In another embodiment, the food is selected from the group comprises: an extruded bar, a sports bar, a baked bar, a plant-based meat analog, a ready to eat meal, a dehydrated food, a shelf-stable food, a frozen food, a fermented food, a yogurt, a non-dairy vegan food, or a pet food. In another embodiment, the potato protein powders are useful as a binding or texture agent for food, a gluten replacement product, an egg replacement product, or similar such uses.

Another aspect of the invention is a method for making a microparticulated potato protein powder, comprising (a) microfiltering potato fruit juice (PFJ) to produce a microfiltered permeate; (b) ultrafiltering the microfiltration permeate to produce an ultrafiltered retentate; (c) microparticulating the ultrafiltered retentate to produce a microparticulated ultrafiltration retentate; and (d) drying the microparticulated ultrafiltration retentate, which produces a microparticulated potato protein powder having a reconstituted powder particle size (D[4,3]) that ranges from about 1 μm to about 100 μm. In some such embodiments, the drying is accomplished by spray drying. In one embodiment, the reconstituted powder particle size (D[4,3]) of the microparticulated potato protein powder ranges from 10-50 μm, or from 10-40 μm, or from 10-30 μm, or from 10-20 μm, or from 1-10 μm. In one embodiment, the reconstituted powder particle size (D[4,3]) of the microparticulated potato protein powder is about 10 μm to about 20 μm. In another embodiment, the reconstituted powder particle size (D[4,3]) of the microparticulated potato protein powder is less than 10 μm. In another embodiment, an optional step of concentrating the microfiltration permeate by reverse osmosis is added prior to step (b). In one embodiment, the ultrafiltration retentate from step (b) is heated to about 85° C. In another embodiment, microparticulation occurs by either simultaneously or subsequently shearing the heated-ultrafiltration retentate. In one embodiment, a step of evaporating the microparticulated ultrafiltration retentate is done prior to step (d) of drying, for example, via spray drying.

In one embodiment, complete, nearly complete, or partial glycoalkaloid reduction and/or removal occurs after step (a) or after step (b). In a further embodiment, glycoalkaloids are removed by a method selected from the group comprising: adsorbing the glycoalkaloids to a charged resin, adsorbing the glycoalkaloids to a hydrophobic resin, adsorbing the glycoalkaloids to a hydrophilic resin, adsorbing glycoalkaloids to a multimodal or mixed-mode resin, using size exclusion chromatography to remove glycoalkaloids, using activated charcoal to remove glycoalkaloids, using layered silicate to remove glycoalkaloids, or by enzymatic hydrolysis of the glycoalkaloids. In yet another embodiment, the total α-glycoalkaloid concentration in the microparticulated potato protein powder is less than 300 ppm, or less than 200 ppm, or less than 100 ppm, or less than 75 ppm, or less than 50 ppm.

In one embodiment, the microparticulated potato protein powder has about 1% to about 20% ash from the PFJ. In another embodiment, the microparticulated potato protein powder has a total amino-acid score equal to, or greater than 1 (AAS≥1). In one embodiment, the microparticulated potato protein powder comprises about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.1%, about 90.2%, about 90.3%, about 90.4%, about 90.5%, about 90.6%, about 90.7%, about 90.8%, about 90.9%, about 91%, about 91.1%, about 91.2%, about 91.3%, about 91.4%, about 91.5%, about 91.6%, about 91.7%, about 91.8%, about 91.9%, to about 92% crude protein.

In one embodiment, the microparticulated potato protein powder has a wettability of nearly 100% in less than 2 minutes when a mass of powder sufficient to prepare an aqueous 5% protein dispersion in 200 g is added to the surface of the water. In another embodiment, the microparticulated potato protein powder has a dispersibility of at least 90% when a mass of powder sufficient to prepare an aqueous 5% protein dispersion in 200 g is added to water and mixed for 1 minute.

Another aspect of the invention is a method for making a native potato protein powder, comprising (a) microfiltering potato fruit juice (PFJ); (b) ultrafiltering the microfiltration permeate to produce a ultrafiltration retentate; (c) drying the ultrafiltration retentate to produce a native potato protein powder; and wherein the native potato protein powder comprises (i) about 60% to about 92% native potato protein consisting substantially of non-denatured potato protein; (ii) about 1 wt. % to about 30 wt. % free amino acids from the PFJ; and (iii) about 1 wt. % to about 20 wt. % ash from the PFJ. In yet another aspect of the invention is a method for making a native potato protein powder, comprising (a) microfiltering potato fruit juice (PFJ) to produce a microfiltration permeate; (b) ultrafiltering the microfiltration permeate to produce a ultrafiltration retentate; (c) drying the ultrafiltration retentate to produce a native potato protein powder; wherein the native potato protein powder comprises (i) about 60% to about 90% native potato protein consisting substantially of non-denatured potato protein; (ii) about 1 wt. % to about 30 wt. % free amino acids from the PFJ; (iii) about 1 wt. % to about 30 wt. % non-protein nitrogen; and (iv) about 1 wt. % to about 20 wt. % ash from the PFJ. In one embodiment, the drying is done accomplished by spray drying. In one embodiment, an optional step of concentrating the microfiltration permeate by reverse osmosis is added prior to step (b). In another embodiment, the potato protein powder comprises free amino acids from about 5 wt. % to about 10 wt. %. In one embodiment, glycoalkaloid removal occurs after step (a) or after step (b). In a further embodiment, the glycoalkaloids are removed in whole or in-part by a method selected from the group comprising: adsorbing the glycoalkaloids to a charged resin, adsorbing the glycoalkaloids to a hydrophobic resin, adsorbing the glycoalkaloids to a hydrophilic resin, adsorbing glycoalkaloids to a multimodal or mixed-mode resin, using size exclusion chromatography to remove glycoalkaloids, using activated charcoal to remove glycoalkaloids, using layered silicate to remove glycoalkaloids, or by enzymatic hydrolysis of the glycoalkaloids. In yet a further embodiment, the total α-glycoalkaloid concentration in the native potato protein powder is less than 300 ppm, or less than 200 ppm, or less than 100 ppm, or less than 75 ppm, or less than 50 ppm. In one embodiment, a step of evaporating the ultrafiltration retentate is done prior to step (c) of spray drying. In one embodiment, the native potato protein powder has a total amino acid score equal to, or greater than 1 (AAS≥1). In a further embodiment, the native potato protein powder has about 60% to about 92% crude protein.

BRIEF DESCRIPTION OF THE FIGURES

FIG. 4A shows the powders added to reverse osmosis water at ambient temperature (22° C.), totally (i.e., completely) undisturbed, after 10 seconds, viewed from the front. FIG. 4B shows the same powders, totally (i.e., completely) undisturbed, on reverse osmosis water (22° C.), after 95 seconds (1 minute and 35 seconds), viewed from the front. The calculated final protein concentration for each of the final protein-water mixtures is 0.5%. The powders are (1) native potato protein powder; (2) microparticulated potato protein powder; (3) soy protein isolate powder; and (4) whey protein isolate powder.

FIG. 5A shows the powders added to reverse osmosis water at ambient temperature (22° C.), totally (i.e., completely) undisturbed, after 10 seconds, viewed from overhead. FIG. 5B shows the same powders, totally (i.e., completely) undisturbed, on reverse osmosis water (22° C.), after 95 seconds (1 minutes and 35 seconds), viewed from overhead. The calculated final protein concentration for each of the final protein-water mixtures is 0.5%. The powders are (1) native potato protein powder; (2) microparticulated potato protein powder; (3) soy protein isolate powder; and (4) whey protein isolate powder.

DETAILED DESCRIPTION

Figure 1:
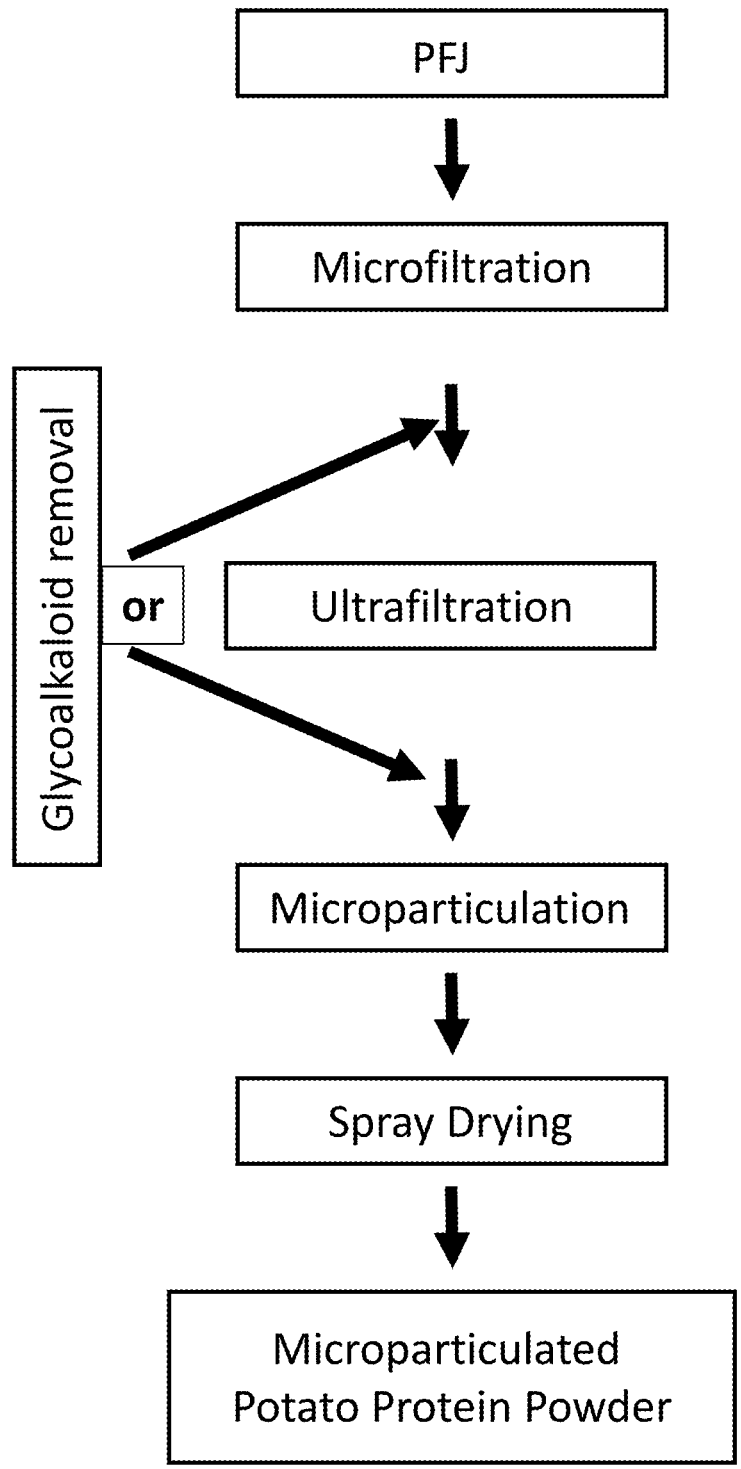
FIG. 1 is a flow diagram of the method of production of microparticulated potato protein powder. The PFJ in this flow diagram is clarified potato fruit juice.

The present specification pertains to a potato protein powder and to methods of preparing the potato protein powder. The potato protein powder of this specification has the unexpected properties of fast wettability and high dispersibility. Additionally, the potato protein powder described in this specification has an amino acid score of greater than or equal to 1 (AAS≥1).

Definitions

The term "amino acid score" (AAS) is a measure of the nutritional quality of a protein, and is calculated using the following formula:

AAS=(mg of first limiting amino acid in 1 g test protein) divided by (mg of the same amino acid in 1 g reference protein).

If the mass of the limiting amino acid in the test protein is greater than the mass of the same amino acid in the reference protein, then the AAS is greater than 1.0 (AAS≥1). As used herein, the limiting amino acids for the reference protein is defined for the pre-school age child (2-5 years). The reference protein essential amino acid requirements of the pre-school age child are given in the Food and Agriculture Organization/World Health Organization (1991) Protein quality evaluation in human diets. FAO Food and Nutrition Paper 51. FAO, Rome.

The term "ash" generally refers to all non-aqueous, non-gaseous residues in a sample after a complete combustion. Complete combustion may be accomplished in a furnace according to AOAC method 942.05. Ash, as used herein, includes both acid ash and alkaline ash. The acid or alkaline ash is designated, based on the residue left on combustion rather than the acidity of the food, foods such as fruits. Ash analysis gives a quick estimate of the total mineral content of a sample.

"Beverage" as used herein may be a ready to drink beverage, or a dry mix beverage.

As used herein "clarification" is a process of separating insoluble material suspended in a liquid from the liquid. Clarification can be done by several means known to one of skill in the art. For example allowing the slurry of insoluble material and liquid settle by gravity and decanting the supernatant (liquid), using centrifugation, using filtration, or a combination of methods to separate the insoluble material from the liquid. In the methods presented herein, potato fruit juice (PFJ) is subjected to clarification to produce clarified PFJ.

The term "crude protein" includes potato-derived proteins, peptides, free amino acids, and non-protein nitrogen compounds. Crude protein is calculated using total percentage nitrogen (TN %) multiplied by a nitrogen conversion factor of 6.25 (crude protein=TN %×6.25). Total percentage nitrogen (TN %) is typically determined by the Dumas method. The correction factor of 6.25 is internationally recognized. See, e.g., FAO FOOD AND NUTRITION PAPER 77, Food energy-methods of analysis and conversion factors, Report of a Technical Workshop, Rome, 3-6 Dec. 2002, FOOD AND AGRICULTURE ORGANIZA- TION OF THE UNITED NATIONS Rome, 003 (also available at: http://www.fao.org/docrep/006/Y5022E/y5022e03.htm).

"Demineralizing" or "demineralization" as used herein means partial or complete removal of inorganic components. Methods of demineralization include deionization, membrane filtration, ion exchange chromatography, electro-dialysis, and other method.

"Dispersibility" is the relative ability of a particle to separate uniformly throughout a liquid, a solid, or a gas. Dispersibility of a powder is the rate at which that powder mixes in a liquid, and is typically measured as mass per unit volume per time, and is expressed as a percentage (Augustin & Clarke. Dry Milk Ingredients, in Chandan & Kilara, eds. Dairy Ingredients for Food Processing, p 141-159 (2011); Touhy. Irish J of Food Sci and Tech, 13:141-152 (1989); and AOAC Official Method 990.19 (1989)). For example, the microparticulated potato protein powder has dispersibility of at least 90% when a mass of powder sufficient to prepare an aqueous 5% protein dispersion in 200 g is mixed for 1 minute. (See Example 10.)

As used herein, "enzymatic hydrolysis" refers to a catalytic decomposition of a chemical compound by reaction with water by the addition of specific enzymes.

As used herein, "fermentation" is the bioconversion of fermentable sugars by lactic acid bacteria species, such as *Lactobacillus, Streptococcus*, and *Bifidobacterium*, to produce lactic acid and lowering the pH of a substrate.

As used herein, "free amino acids" (FAA) means individual potato-derived amino acids that are not components of peptides or proteins. Free amino acids are measured using various methods such as LC/MS that are well known to one skilled in the art.

"Functionalized" as used herein, means potato proteins or potato protein powders where at least one of the functional properties of the native potato proteins or native potato protein powders has been altered. Non-limiting examples of properties that may be altered in a functionalized protein include: gelling, foaming, water binding, oil or fat binding, emulsifying, viscosity, solubility, heat stability, wettability, and dispersibility. In one embodiment, a functionalized potato protein may provide a nutritional benefit due to altered properties conferring for example better digestibility or a different rate of absorption.

As used herein, "glycoalkaloids" refers to a group of plant compounds, which are alkaloids with sugar moieties. Numerous alkaloids are present in potato, including the glycoalkaloids α-chaconine, α-solanine, β-chaconine, β-solanine, and γ-chaconine, and the aglycone solanidine. Total α-glycoalkaloid is the sum of α-chaconine and α-solanine. Total alkaloid is the sum of α-chaconine, α-solanine, β-chaconine, β-solanine, γ-chaconine and solanidine. Alkaloid levels are assayed using standard LC-MS methods well known to one skilled in the art.

"Microfiltration" (MF) as used herein refers to a pressure-driven membrane process where a fluid is passed through membranes that have a pore size in the 0.03-0.1 to 10 microns range in order to separate out particles in the micron size range such as microorganisms and suspended particles. Microfiltration is accomplished with a membrane consisting of a chemical composition selected from the group comprising polytetrafluoroethylene, cellulose acetate, nitrocellulose, polyvinylidenefluoride, polyethersulfone, polyamide, nylon, porous alumina, sintered metals, and zirconium oxide.

"Microparticulating" or "microparticulation" as used herein is a process of aggregation or precipitation of protein with heat, and simultaneous or subsequent reduction of the size of the resulting protein aggregates with shear to produce a microparticulated composition. In general, "microparticulated" means composed of microparticles.

"Minerals" as used herein means one or more of the inorganic compounds selected from the group comprising: calcium, chloride, copper, iodine, iron, magnesium, manganese, phosphorous, potassium, selenium, sodium, and zinc.

The term "native potato protein" as used herein means a non-denatured potato protein retaining the native 3-dimensional shape and native function (for example, enzymatic activity). Examples of native potato proteins include patatin and protease inhibitors.

"Non-protein nitrogen" (NPN) as used herein to refers collectively to free amino acids, peptides, and other soluble nitrogen-containing compounds remaining after protein precipitation. NPN % is determined by a Dumas or Kjeldahl method preceded by protein precipitation as known by those skilled in the art, and is expressed as NPN %=6.25.

"Mean particle size" as used herein is the mean associated with the volume distribution of the particles. The volume mean calculation is based on the upper and lower limits of a histogram of n size channels along with the percent within the channels. The $D_i$ value for each channel is the geometric mean (i.e., the square root of the upper×lower diameters). For example, for D[4,3] the numerator is the geometric mean to the fourth power multiplied by the percent in that channel, summed over all channel; and, the denominator is the geometric mean to the third power multiplied by the percent in that channel, summed over all channels. See, e.g., ASTM E 799-03, Standard Practice for Determining Data Criteria and Processing for Liquid Drop Size Analysis.

The term "permeate" and the term "retentate" as used herein refer to the two product streams generated from pressure-driven membrane processes such as microfiltration, ultrafiltration, and reverse osmosis. The permeate stream comprises all of the membrane feed components and water that have passed through the membranes and the retentate comprises all of the membrane feed components and water that have been retained by the membranes.

"Powder" as used herein means a dried material of solid particles.

"Protein concentrate" as used herein refers to a protein powder wherein the percent amount of protein ranges from about 30% to about 80% (i.e., about 30% to about 80% protein purity).

"Protein isolate" as used herein refers to a protein powder wherein the percent amount of protein is about 90% (i.e., about 90% protein purity).

"Reverse osmosis" (RO) as used herein is a pressure driven membrane process that is primarily used to remove or purify water. Reverse osmosis is accomplished with a high pressure system using membranes composed of zeolites, carbon nanotubes, cellulose acetate, polysulfone and polyamides. In a further embodiment, a reverse osmosis membrane has a pore size in a range of 0.1 to 5,000 nm.

"Spray drying" as used herein means dispersing a liquid in a stream through heated air to evaporate water and collect the dispersed, dried solids.

As used herein, "total solids" is the percentage of total solids remaining in a liquid or powder sample after drying the liquid or powder sample using an approved AOAC method.

"Syneresis" as used herein means the contraction of a gel accompanied by the separating out of liquid.

As used herein, "true protein" is calculated as follows: (TN %–NPN %) multiplied by 6.25, where TN % is total percentage nitrogen, and NPN % is the percentage non-protein nitrogen.

"Ultrafiltration (UF)" as used herein refers to a pressure-driven membrane process where a fluid is passed through membranes that have a pore size in the 0.001-0.01 to 0.1 micron range or a molecular weight cut-off between approx. 1 and approx. 800 kDa. Ultrafiltration retains components larger than the membrane pore size such as fats and proteins and permeates small components such as sugars and minerals. Ultrafiltration membranes may be made of polypropylene, cellulose acetate, polylactic acid, polyethersulfone, ceramics, polyacrylonitrile, or polyvinylidenefluoride. It will be understood by one skilled in the art that the choice of membrane, ultrafiltration process, and flow rate determine the retentate composition relative to the ultrafiltration feed.

As used herein, a "vegan yogurt" is a non-dairy protein gel-like food product produced by fermentation of plant-based water extractable proteins using lactic acid bacteria cultures and having a pH of <4.5.

As used herein, "wettability" is a functional characteristic of a powder to be reconstituted in water. To wet, the powder must overcome the surface tension between itself and the water. Wettability is measured by placing a defined mass of powder on the surface of a known volume of water at a set temperature and measuring the time taken for all of the powder to disappear or sink below the surface of the water (Augustin & Clarke. (2011), ibid.

Potato protein powders are prepared from potato *Solanum tuberosum*. Any cultivar of potato can be used for preparing potato protein powders. Potato protein powders are prepared from potato fruit juice (PFJ). One of skill in the art would know the steps of preparing PFJ.

The methods presented in this specification include processes for preparing a potato protein powder including one or more of the following steps: microfiltration, ultrafiltration, and reverse osmosis. Microfiltration (MF), ultrafiltration (UF) and reverse osmosis (RO) are common pressure-driven membrane processes that differ in the sizes of the components retained on the retentate side of the membrane. The two products generated from any these pressure-driven membrane processes are the retentate and permeate. The retentate comprises all of the components and water retained by the membranes. The permeate comprises all of the components and water that permeated the membranes. The process of processing clarified potato fruit juice with microfiltration, an optional step of reverse osmosis, and a step of ultrafiltration leads to a concentrated ultrafiltration retentate high in potato protein and amino acids.

Generally, membrane filtration is state-of-the-art technology for clarification, concentration, fractionation (separation of components), desalting and purification of a variety of food and beverages. Membrane processing or filtration is a technique in which particles are separated from liquids by being forced through a physical barrier, porous material, filter or membrane. Particles are separated based on their size and shape with the use of pressure and specially designed membranes with different pore sizes. The different membrane filtration methods separate or concentrate substances in a liquid using pressure driven processes, electrical field driven processes, and concentration driven processes. Somewhat newer applications include microfiltration, ultrafiltration, reverse osmosis, electrodialysis, and pervaporation. These applications offer an effective means of recovering the by-products (e.g., carbohydrates, soluble vitamins and minerals), which can be used for further food formulations. Furthermore, these techniques also improve the food safety of products (e.g., by reducing the presence of potentially harmful bacteria or other microorganisms) while avoiding heat treatment. Some examples of final products using membrane processing technologies include but are not limited to fruit and vegetable juices (e.g., apple or carrot), cheeses (e.g., ricotta), ice cream, butter or some fermented milks; skimmed or low-lactose dairy products; microfiltered milk; non-alcoholic beers, wines and ciders, etc.

For additional examples of suitable filters/membranes to use in the processing of plant materials to be used in foods, feeds and beverages, see, e.g., United States Patent Application 20040089601 (Use of polyisocyanate resins in filter layers); U.S. Pat. No. 7,651,619 (Filtration method and apparatus); U.S. Pat. No. 7,531,086 (Pressure filter apparatus); U.S. Pat. No. 5,997,652 (Food starch processing method and apparatus); U.S. Pat. No. 9,925,496 (Upgrading process streams); and, United States Patent Application 20180056244 (Methods and apparatuses for reducing membrane fouling, scaling, and concentration polarization using ultrasound wave energy (USWE)). For general reviews of food processing using filtration technologies, see, e.g., Membrane Processing for Dairy Ingredient Separation (Institute of Food Technologists Series) 1st Edition, 2015, Kang Hu (Editor), James Dickson (Editor), Wiley-Blackwell; Food Processing Technology: Principles and Practice 4th Edition, 2016, P. J. Fellows, Woodhead Publishing; Principles and Practice for the Safe Processing of Foods, 1998, David Shapton, Woodhead Publishing.

Potatoes contain glycoalkaloids and alkaloids that can be toxic if consumed at certain levels. There are numerous glycoalkaloids, including α-chaconine, α-solanine, β-chaconine, β-solanine, and γ-chaconine, and the aglycone solanidine. Alkaloids are removed by use of one or more methods, such as adsorbing alkaloids to a charged resin, a hydrophobic resin, a hydrophilic resin, a multimodal or mixed-mode resin; or using size exclusion chromatography to remove alkaloids; or using activated charcoal to remove alkaloids; or using layered silicate to remove alkaloids; or using enzymatic hydrolysis of alkaloids. The amount of alkaloid removal using a resin is determined by the resin properties such as effective size, surface area, pore volume, pore radius, specific gravity, particle size distribution, charge, hydrophobicity, hydrophilicity, appropriate pH range, and temperature maximum. In addition to the resin properties, the amount of alkaloid removal is determined by the resin column run conditions such as the specific resin properties, the resin column volume, the number of columns, the rate that fluid is run through the columns, and the number of times the fluid is run over the columns. In the processes of the present specification, alkaloids are removed from the microfiltration permeate, or from ultrafiltration retentate.

Assays for detecting and measuring glycoalkaloid and alkaloid concentrations in a sample include standard LC-MS; cholinesterase-based sensors; high-performance thin-layer chromatography coupled with iodine vapor detection; ELISA assays; or bromophenol titration. In one embodiment, the concentration of total α-glycoalkaloids (the sum of α-chaconine and α-solanine) in the potato protein powder prepared as described herein is: 1 ppm, about 2 ppm, about 3 ppm, about 4 ppm, about 5 ppm, about 6 ppm, about 7 ppm, about 8 ppm, about 9 ppm, about 10 ppm, about 11 ppm, about 12 ppm, about 13 ppm, about 14 ppm, about 15, ppm, about 16 ppm, about 17 ppm, about 18 ppm, about 19 ppm, about 20 ppm, about 21 ppm, about 22 ppm, about 23 ppm, about 24 ppm, about 25 ppm, about 26 ppm, about 27 ppm, about 28 ppm, about 29 ppm, about 30 ppm, about 31 ppm, about 32 ppm, about 33 ppm, about 34 ppm, about 35 ppm, about 36 ppm, about 37 ppm, about 38 ppm, about 39 ppm, about 40 ppm, about 41 ppm, about 42 ppm, about 43 ppm, about 44 ppm, about 45 ppm, about 46 ppm, about 47 ppm, about 48 ppm, about 49 ppm, about 50 ppm, about 51 ppm, about 52 ppm, about 53 ppm, about 54 ppm, about 55 ppm, about 56 ppm, about 57 ppm, about 58 ppm, about 59 ppm, about 60 ppm, about 61 ppm, about 62 ppm, about 63 ppm, about 64 ppm, about 65 ppm, about 66 ppm, about 67 ppm, about 68 ppm, about 69 ppm, about 70 ppm, about 71 ppm, about 72 ppm, about 73 ppm, about 74 ppm, about 75 ppm, about 76 ppm, about 77 ppm, about 78 ppm, about 79 ppm, about 80 ppm, about 81 ppm, about 82 ppm, about 83 ppm, about 84 ppm, about 85 ppm, about 86 ppm, about 87 ppm, about 88 ppm, about 89 ppm, about 90 ppm, about 91 ppm, about 92 ppm, about 93 ppm, about 94 ppm, about 95 ppm, about 96 ppm, about 97 ppm, about 98 ppm, about 99 ppm, about 100 ppm, about 150 ppm, about 200 ppm, about 250 ppm, and about 300 ppm. In another embodiment, the concentration of total α-glycoalkaloids in the potato protein powders is about 30-about 80 ppm, or about 30-about 70 ppm, or about 30-about 50 ppm.

For additional references on the presence, detection and reduction/removal of glycoalkaloids from potatoes, see, e.g., United States Patent Application 20180042265 (Method for preparing a food grade coagulated potato protein concentrate); U.S. Pat. No. 9,526,266 (Glycoalkaloid removal); U.S. Pat. No. 8,486,481 (Glycoalkaloid removal) and, U.S. Pat. No. 8,465,911 (Native potato protein isolates).

The ultrafiltration retentate is subjected to drying. Any number of drying methods are known in the art. For example freeze-drying, spray drying, or flash drying, with or without prior evaporation.

A functionalized protein is a protein that has been modified by any number of processes, for example, chemical modification, denaturation, coagulation, precipitation, fractionation, microparticulation, or enrichment. The modifications produce proteins with different functional properties. Two examples of functional properties include wettability, and dispersibility. Wettability relates to the rate of sinkability of a powder in water. To wet, the powder must overcome the surface tension between itself and the water. Wettability is measured by placing a defined mass of powder on the surface of a known volume of water at a set temperature and measuring the time taken for all of the powder to disappear or sink below the surface of the water (Augustin & Clarke, 2011, ibid). Dispersibility of a powder is the rate at which that powder mixes in a liquid, and is typically measured as mass per unit volume per time, and is expressed as a percentage (Augustin & Clarke. (2011), ibid; Touhy, (1989), ibid; and AOAC Official Method 990.19 (1989)). Functionalized proteins may have improved nutritional benefits. Functionalized proteins may have improved properties in beverages or processed foods.

One method of preparing a microparticulated potato protein powder is a process of generating protein aggregates and simultaneously or subsequently reducing the size of the resulting protein aggregates. Non-limiting examples of preparing protein aggregates include: heat, pH adjustment, high-pressure processing, salt precipitation, or alcohol precipitation. Non-limiting examples of reducing the protein particle size include: physical or mechanical disruption including shearing, grinding, homogenization, or sonication. Through these processes, the functional properties of the microparticulated potato protein powder may be altered.

For additional information on microparticulated plant proteins, see, e.g., Beran et al., Pilot-scale production and application of microparticulated plant proteins, 2018, Journal of Nutrition & Food Sciences, Vol. 8, No. 1, 8 pgs.; Young et al., Nutritional implications of microparticulated protein, 2013, Journal of the American College of Nutrition, pgs. 418-426; N. S. Singer and J M Dunn, Protein microparticulation: the principle and the process, 2013, Journal of the American College of Nutrition, pgs. 388-397; M Kalab, Microparticulate protein in foods, 1990, Journal of the American College of Nutrition, 374-387; and, J W Erdman Jr., The quality of microparticulated protein, 1990, Journal of the American College of Nutrition, pgs. 398-409.

The particle size of powders is one parameter that may affect the functional properties of wettability and dispersibility. Several methods are known for measuring powder particle size, or more accurately, particle size distribution. Once a representative sample has been prepared, particle size distribution can be measured by one or more of the following methods: screen analysis; mechanical sieving; optical methods; electrozone sensing; sedimentation; or light scattering (Horinka, June 1995, Powder particle size: measurement and communication, Powder Coating, pgs. 69-75). A typical value of the mean particle size distribution is D [4,3]. Another measure of particle size are the median values, which are typically expressed as D50. Particle size distribution values are typically expressed as D10, D50, and D90.

In one embodiment, the microparticulated potato protein powder comprises reconstituted powder particle size (D[4, 3]) of about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, about 60 μm, about 61 μm, about 62 μm, about 63 μm, about 64 μm, about 65 μm, about 66 μm, about 67 μm, about 68 μm, about 69 μm, about 70 μm, about 71 μm, about 72 μm, about 73 μm, about 74 μm, about 75 μm, about 76 μm, about 77 μm, about 78 μm, about 79 μm, about 80 μm, about 81 μm, about 82 μm, about 83 μm, about 84 μm, about 85 μm, about 86 μm, about 87 μm, about 88 μm, about 89 μm, about 90 μm, about 91 μm, about 92 μm, about 93 μm, about 94 μm, about 95 μm, about 96 μm, about 97 μm, about 98 μm, about 99 μm, to about 100 μm.

In another embodiment, substantially all of the particles in the potato protein powder comprise a reconstituted powder particle size (D[4,3]) of 1-50 μm, or 1-25 μm, or more particularly 1-10 μm.

Potatoes are a rich source of protein. Non-limiting examples of potato protein include patatin or protease inhibitors. Methods of preparing potato protein powders are disclosed herein.

In one embodiment, the percentage of potato protein, measured as crude protein, in the potato protein powders is 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.1%, about 90.2%, about 90.3%, about 90.4%, about 90.5%, about 90.6%, about 90.7%, about 90.8%, about 90.9%, about 91%, about 91.1%, about 91.2%, about 91.3%, about 91.4%, about 91.5%, about 91.6%, about 91.7%, about 91.8%, about 91.9%, to about 92% crude protein of the total mass of the powder. In another embodiment, the percentage of crude potato protein in the potato protein powder is about 60%-about 90%, or about 60-about 80%, or about 70%-about 80%, or about 80%.

In one embodiment, the percentage of free amino acids in the potato protein powders is about 1%, about 2%, about 3%, about 4%, 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, to about 30% of the total mass.

In one embodiment, the non-protein nitrogen (NPN) compounds, calculated as NPN %×625, in the potato protein powders is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, to about 30% of the total mass. In some embodiments, an 80% potato protein concentrate has about 5% (NPN×6.25). In other embodiments, a potato protein isolate has about 1% (NPN× 6.25).

Potatoes are a rich source of minerals, especially potassium. Ash analysis gives a quick estimate of the total mineral content of a sample. Ash generally refers to all non-aqueous, non-gaseous residues in a sample after a complete combustion. In one embodiment, the microparticulated potato protein powder has 1-20% ash from the PFJ. In another embodiment, the potato protein powders contain ash which is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, to about 20% of the total mass of the powder. In yet another embodiment, the potato protein powder substantially lacks ash. The mineral content or composition of a sample can be measured using methods known in the art. Non-limiting examples of techniques to measure minerals include: atomic absorption spectrometry, atomic emission spectrometry, x-ray fluorescence analysis, neutron activation analysis, mass spectrometry, beam (position-sensitive) methods, secondary ion mass spectrometry, laser ablation coupling techniques (such as Inductively Coupled Plasma-Mass Spectrometry), proton induced x-ray emission (PIXE) and gamma-ray emission (PIGE), and electron microprobe analysis (EMPA).

Sensory characteristics as used herein means the perceived appearance, color, aroma, sweetness, flavor, and texture of a food product while being consumed. Panels of professionally trained individuals can evaluate food products for sensory characteristics such as appearance, color, aroma, sweetness, flavor, and texture. Thus, the present invention contemplates improving the sensory characteristics of a food or nutritional product containing a potato protein powder or a plant based protein powder prepared according to the methods of this disclosure.

Potato protein powders are useful as ingredients in beverages, feeds, and processed foods as heat stability, foaming, water binding, oil binding, emulsifying, gelling or viscosity increasing agents. Potato protein powders are useful as nutritional supplements due to the high potato protein content, a high percentage of FAA, a high amino-acid score (AAS), a high mineral content, and a low total α-glycoalkaloid content. Microparticulated potato protein powders may provide a nutritional benefit when consumed due to altered properties of the potato proteins, for example better digestibility or a higher rate of absorption. Furthermore, the potato protein may be beneficial as a low allergenic plant-based, protein source. The potato protein powders of the invention comprise favorable sensory characteristics, thus making these useful as an ingredient for beverages and processed foods. In one embodiment, the food is selected from the group comprising: an extruded bar, a sports bar, a baked bar, a plant-based meat analog, a ready to eat meal, a dehydrated food, a shelf-stable food, a frozen food, a fermented food, a non-dairy vegan food, or a pet food. In another embodiment the potato protein powders are useful as a binding or texture agent for food, a gluten replacement product, an egg replacement product, or similar such uses. A beverage may be a ready to drink beverage, or a dry mix beverage. In one embodiment, a beverage comprising a microparticulated potato protein powder is selected from the group comprising: a nutritional supplement (for example, PediaSure™ or Ensure™), a sports recovery drink, a protein shake, or a plant-based non-dairy beverage.

Figure 6:
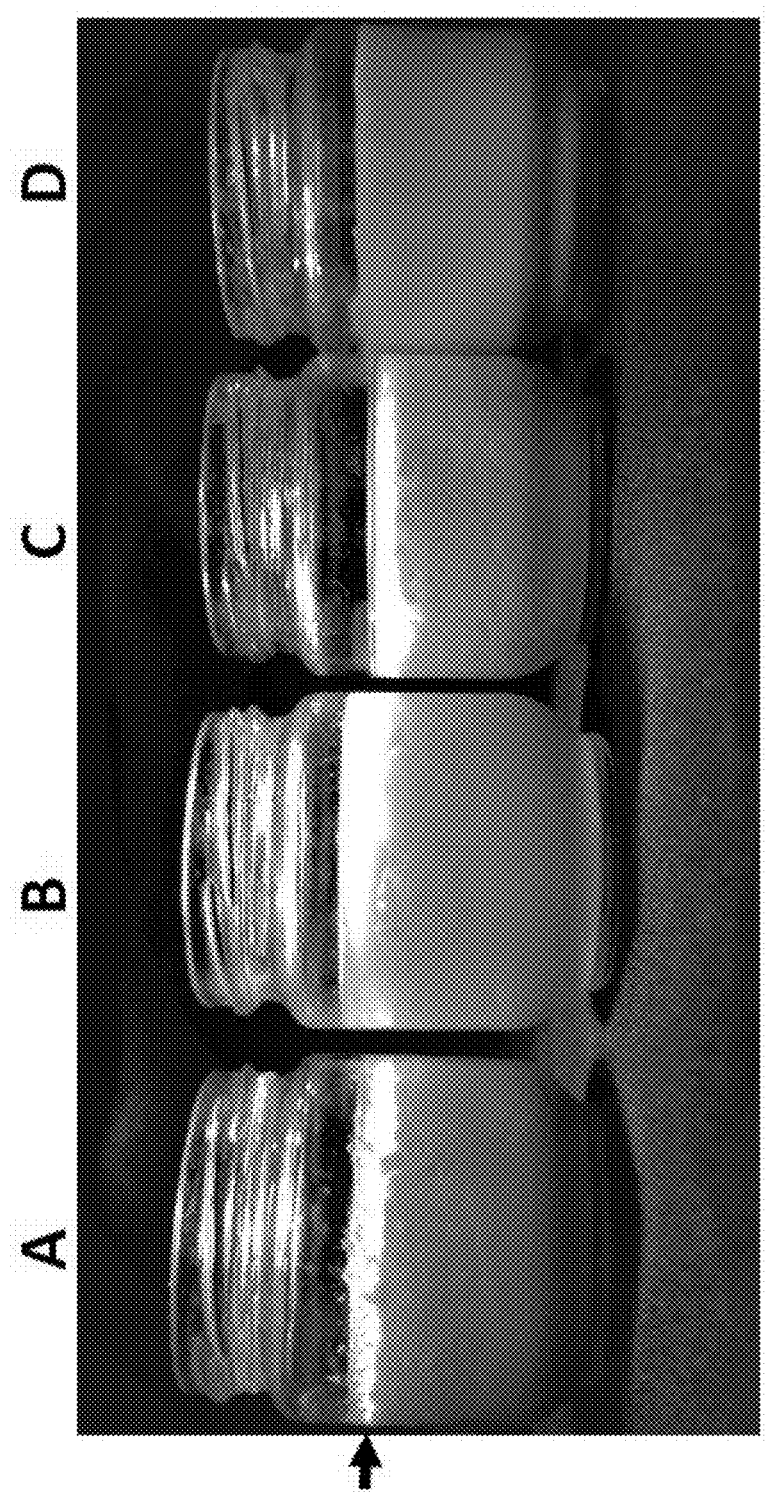
FIG. 6 shows the syneresis in the fermented plant protein yogurts. The yogurts were refrigerated for 24 hours after the completion of the fermentation process. The arrow indicates the undesirable separation of water from the gel-like structure of the fermented product in samples A, B, and C. With the separation of water, the yogurts had a visible grainy, curd-like structure. There is an absence of syneresis observable in the yogurt prepared with the native potato protein powder. The calculated final protein concentration of each of the yogurts is 5%. The yogurts were prepared with the following plant protein powders: jar A—pea protein; jar B—control (no added protein); jar C—soy protein; and jar D—native potato protein.

In some contemplated applications, the native potato protein powder is used to prepare a fermented food, such as, but not limited to, yogurt. In one embodiment, yogurt is prepared with a milk base. In another embodiment, yogurt is vegan, or prepared with a plant-based 'milk' product. Upon completion of fermentation, the fermented yogurt has a gel-like structure. Upon refrigeration an undesirable syneresis (separation of water from the structure of the fermented product) may occur. With syneresis, the yogurt may develop a visible grainy, curd-like structure. There was an unexpected absence of syneresis in vegan yogurt prepared with the native potato protein powder. This means that there was little to no water separated from the yogurt, as illustrated in FIG. 6.

For information on food and beverage products made from vegetable proteins and vegetable protein powders, see, e.g., United States Patent Application 20120128832 (Organic vegan protein shakes); United States Patent Application 20180064155 (Instant thickened dry food compositions); United States Patent Application 20170258123 (An inclusion containing proteinaceous meat analogue having an improved texture and an extended shelf-life); United States Patent Application 20150056346 (Plant-based food products, compositions, and methods); United States Patent Application 20170303558 (Extruded plant protein product with colouring plant ingredients and production method); United States Patent Application 20170150734 (Food comprising proteins mainly of plant origin and preparation method thereof); United States Patent Application 20160278403 (Vegetable protein products and methods for making the same); United States Patent Application 20140272094 (Textured vegetable protein as a meat substitute and methods and composition for making same); United States Patent Application 20140161958 (Meat substitute product); U.S. Pat. No. 8,293,316 (Method for the preparation of meat and vegetable protein based substitute food products); and, United States Patent Application 20100136202 (Method for preparing a vegetable food product and vegetable food product thereby obtained).

Unless defined otherwise, all technical and scientific terms used herein have the same meaning as commonly understood by one of ordinary skill in the art to which this invention belongs. Generally, the nomenclature used herein, and the laboratory procedures described herein, are those well known and commonly employed in the art.

Having now fully described this invention, it will be appreciated by those skilled in the art that the same can be performed within a wide range of equivalent parameters, concentrations and conditions, without undue experimentation. This application is intended to cover any variations, uses, or adaptations of the invention, following in general the principles of the invention, that include such departures from the present disclosure as come within known or customary practice within the art to which the invention pertains and as may be applied to the essential features hereinbefore set forth.

The following examples are given to illustrate the present invention. It should be understood, however, that the invention is not to be limited to the specific conditions or details described in these examples. Throughout the specification, any and all references to publicly available documents are specifically incorporated by reference.

EXAMPLES

Example 1. Clarified Potato Fruit Juice

Potatoes were selected, washed, and peeled. Peeling was done with abrasion or knives. The washed and peeled potatoes were sanitized then, shredded in the presence of potassium metabisulfite (approximately 60 mL of a 0.3% solution per 19 kg of shredded potato). Shredding of the potatoes was done with a Goodnature X-6 commercial cold press juicer (Goodnature, Orchard Park, NY). The resulting potato pulp was pressed to extract potato fruit juice (PFJ). The PFJ was stored overnight at 4° C. to allow the starch granules and fiber to settle. The next day, the supernatant was decanted and the clarified PFJ was collected and transferred to a chilled feed tank prior to microfiltration.

Example 2. Microfiltration

The clarified PFJ was pumped at a rate of 140 gallons per minute across a Membralox® ceramic microfiltration membrane with a pore size of 1.4 micron (Pall Membrane, Port Washington, NY). The microfiltration permeate was collected and stored at 4° C. overnight.

Example 3. Ultrafiltration

The next day, the microfiltration permeate was pumped at a rate of 70 gallons per minute across a Synder® polyethersulfone (PES) MT ultrafiltration membrane with a pore size of 5 kDa (Synder Filtration, Vacaville, CA). The ultrafiltration retentate was collected and stored at 4° C. overnight.

Example 4. Removal of Alkaloids

To remove alkaloids the microfiltration permeate or the ultrafiltration retentate was pumped through adsorptive resin columns and the flow-through was collected and stored at 4° C. overnight. The adsorptive resin selected for the columns and the column run conditions were optimized to give a low concentration of total α-glycoalkaloid level in the final potato protein powders. Alkaloid levels for α-chaconine, α-solanine, β-chaconine, β-solanine, γ-chaconine, and the aglycone solanidine were assayed using standard LC-MS methods well known to one skilled in the art. Total α-glycoalkaloid is the sum of α-chaconine and α-solanine. Total alkaloid is the sum of α-chaconine, α-solanine, β-chaconine, β-solanine, γ-chaconine, and solanidine.

Table 1 shows the average (ppm) and the range (ppm) of the concentration of α-chaconine, α-solanine, β-chaconine, β-solanine, γ-chaconine, and solanidine, total α-glycoalkaloid, and total alkaloid for 13 samples of microparticulated potato protein powder, and for 23 samples of native potato protein powder. These data confirm that the total α-glycoalkaloid level in the microparticulated potato protein powder ranges from 72.3 ppm to 250.6 ppm, with an average from 13 samples of 128.5 ppm. These data also confirm that the total α-glycoalkaloid level in the native potato protein powder ranges from 66.4 ppm to 290.3 ppm, with an average of from 23 samples of 147.4 ppm.

TABLE 1

Glycoalkaloid analysis of potato protein powders.

| | Microparticulated Potato Protein Powder (20 samples) | | Native Potato Protein Powder (29 samples) | |
|---|---|---|---|---|
| | AVG (ppm) | Range (ppm) | AVG (ppm) | Range (ppm) |
| α-Solanine | 102.4 | 64.9-156.3 | 124.3 | 59.6-230.6 |
| α-Chaconine | 26.1 | 6.4-94.3 | 22.5 | 7.2-59.7 |
| β2-Solanine | 1.56 | 0.7-4.9 | 0.5 | 0.0-1.3 |
| β-Chaconine | 155.7 | 98.0-231.4 | 83.0 | 41.3-235.4 |
| γ-Chaconine | 4.4 | 2.5-13.9 | 1.4 | 0.0-10.8 |
| Solanidine | 41.8 | 11.3-67.4 | 129.6 | 6.0-514.6 |
| Total α-glycoalkaloids | 128.5 | 72.3-250.6 | 147.4 | 66.4-290.3 |
| Total alkaloids | 337.5 | 183.8-568.2 | 361.8 | 114.1-1052.4 |

Example 5. Microparticulation

The collected flow-through from the glycoalkaloid removal step was heated to 85° C. in a scraped surface heat exchanger and held at 85° C. for 5 minutes ("the heating step"). Then, the heated material was recirculated in a shear pump until a smooth texture was obtained ("the shearing step"), and this product was fed into a Panther™ NS3006L homogenizer (GEA, Parma, Italy) ("the homogenizing step") and the microparticulated material was collected.

Example 6. Spray Drying and Analysis

Material collected from Example 4 or Example 5 was spray-dried with a single effect spray dryer using a spray nozzle that disperses a liquid into a stream of hot air, such as an Anhydro Model S1 spray dryer (Anhydro, Soeborg, Denmark). Samples of potato protein powders collected from the spray dryer were analyzed for protein, mineral content and mineral composition, glycoalkaloids and alkaloids, moisture, sugars, fiber, starch, wettability, dispersibility, and particle size.

Protein analysis of the potato protein powders included measuring total solids, crude protein, and non-protein nitrogen. Standard methods were used to measure total solids (%), free amino acid (FAA) levels, the total percentage nitrogen (TN %), and non-protein nitrogen (NPN %) levels in potato protein powders. These values were used to calculate, crude protein and true protein levels. For example, the percentage total solids, and percent moisture were determined using the AOAC® INTERNATIONAL Official Method 925.10 using a forced air oven. Free amino acid (FAA) levels were determined by using the EZfaast™ with LC/MS method (Phenomenex, Torrance, CA). Total percentage nitrogen (TN %) was determined by the Dumas method. Non-protein nitrogen (NPN %) compounds were determined by a Kjeldahl method preceded by protein precipitation. Crude protein percentage was calculated by multiplying TN % by 6.25. The values of total solids, crude protein, and non-protein nitrogen (NPN %×6.25) for microparticulated potato protein powder, and native potato protein powder samples are presented in Table 2.

TABLE 2

Protein of values in potato protein powders.

|  | Microparticulated Potato Protein Powder (12 samples) | | Native Potato Protein Powder (23 samples) | |
| --- | --- | --- | --- | --- |
|  | AVG (%) | Range (%) | AVG (%) | Range (%) |
| Total Solids (%) | 94.7 | 89.2-96.7 | 92.9 | 85.3-97.0 |
| Crude Protein (%) | 77.5 | 74.6-81.7 | 72.5 | 67.3-77.8 |
| Non-Protein Nitrogen (NPN % × 6.25) | 17.0 | 9.9-31.0 | 19.0 | 10.0-27.4 |

The mineral content of the potato protein powders was determined by the method of Inductively Coupled Plasma-Mass Spectrometry. The average (AVG) mineral profiles of, and ranges of individual mineral contents in 12 samples of microparticulated potato protein powder, and 23 samples of native potato protein powder are reported in Table 3. The analysis included the concentration (ppm) of the following minerals: calcium, copper, iron, manganese, magnesium, phosphorus, potassium, selenium (ppb), sodium, and zinc. Of note is the potassium level for both the microparticulated and the native potato protein powders. Specifically, for the microparticulated potato protein powder the potassium level ranged from 34400 ppm to 55700 ppm, with an average over 12 samples of 43557 ppm. For the native potato protein powder, the potassium level ranged from 29100 ppm to 57100 ppm, with an average over 23 samples of 45510 ppm.

TABLE 3

Mineral analysis of potato protein powders.

|  | Microparticulated Potato Protein Powder (12 samples) | | Native Potato Protein Powder (23 samples) | |
| --- | --- | --- | --- | --- |
|  | AVG (ppm) | Range (ppm) | AVG (ppm) | Range (ppm) |
| Calcium | 580 | 297-1220 | 985 | 439-1270 |
| Copper | 30 | 12-47 | 45 | 12-60 |
| Iron | 195 | 53-241 | 99 | 14-235 |
| Manganese | 22 | 18-28 | 20 | 9-31 |
| Magnesium | 3018 | 2710-3390 | 33149 | 1670-4230 |
| Phosphorus | 116951 | 8460-14800 | 9011 | 5700-14700 |
| Potassium | 43557 | 34400-55700 | 45510 | 29100-57100 |
| Selenium (ppb) | 25 | <0.05-108 | 110 | 37-147 |
| Sodium | 334 | 175-949 | 1080 | 183-2500 |
| Zinc | 48 | 42-64 | 49 | 30-61 |

The potato protein powders were further analyzed for the following compositional properties: moisture, sugars, fiber, and starch (see Table 4). Moisture and total solids was determined by following AOAC® INTERNATIONAL Official Methods 990.20 and 990.19, and used a convection oven. Analysis of the sugars: glucose, fructose, and sucrose, were determined by HPLC. Fiber (total of soluble and insoluble) was determined by following the AOAC® INTERNATIONAL Official Method 991.43. This method uses an Enzymatic Gravimetric Method and used a total dietary fiber assay kit (Megazyme Inc., Chicago IL). Starch content was determined by following the AOAC® INTERNATIONAL Official Method 996.11.

TABLE 4

Analysis of potato protein powders.

|  | Microparticulated Potato Protein Powder (6 samples) | | Native Potato Protein Powder (4 samples) | |
| --- | --- | --- | --- | --- |
|  | AVG (%) | Range (%) | AVG (%) | Range (%) |
| Moisture | 5.8 | 3.3-10.8 | 7.8 | 2.98-14.72 |
| Sugars | 2.6 | 0.9-3.6 | 1.6 | 0.4-2.9 |
| Fiber (soluble and insoluble) | 4.6 | 1.3-9.1 | 5.4 | 2.4-14 |
| Starch | 0.2 | <LOD-0.7 | 0.08 | <LOD-0.4 |

LOD—Limit of Detection

Example 7. Native Potato Protein Powder Production

Figure 2:
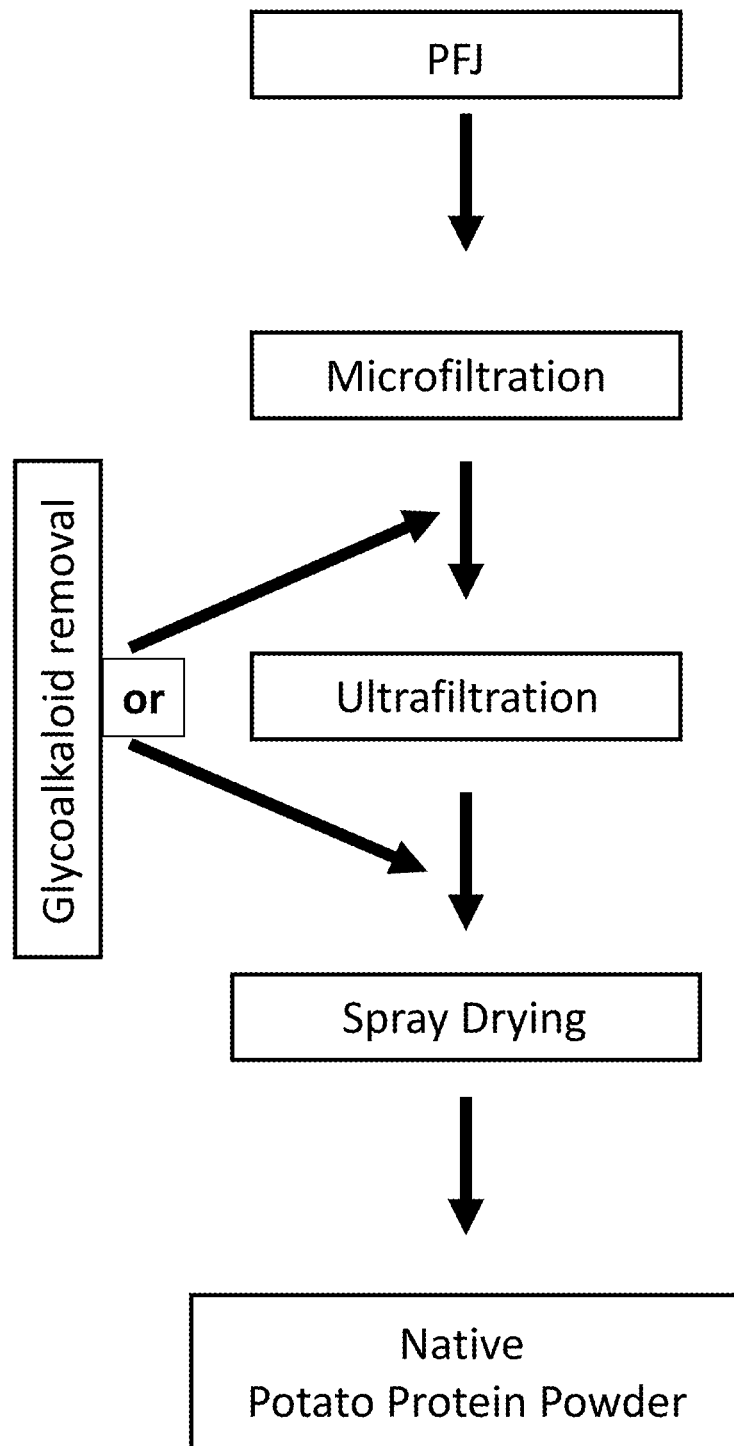
FIG. 2 is a flow diagram of the method of production of native potato protein powder. The PFJ in this flow diagram is clarified potato fruit juice.

Native potato protein powders were produced by removing alkaloids from either the microfiltration permeate or from the ultrafiltration retentate, and spray drying the alkaloid-reduced ultrafiltration retentate, as illustrated in the flow chart presented in FIG. 2. It is well known by those skilled in the art that the protein content of protein powders produced using ultrafiltration can be varied by varying ultrafiltration conditions such as the volume concentration factor (VCF) and the amount of water added during ultrafiltration (diafiltration). Table 5 shows the typical compositions of spray dried microfiltered (MF) PFJ powder, PPC70 (70% protein potato protein concentrate) produced using the process illustrated in FIGS. 2 and PPC80 (80% protein potato protein concentrate) produced using the process illustrated in FIG. 2. Sugars were measured using the phenol sulfuric method for total carbohydrate, acid-stable amino acids were analyzed using AOAC International Official Method 994.12 (HCl hydrolysis followed by RP HPLC separation using ACCQ Tag derivatization), sulfur amino acids were measured using AOAC International Official Method 994.12 (performic acid oxidation) and tryptophan was measured using AOAC International Official Method 988.15 (alkaline hydrolysis). Fat content was determined using AOAC International Official Method 992.06 (modified Mojonnier method), or a Soxhlet extraction method.

Table 5 shows that ultrafiltration surprisingly increases the amino acid score (AAS) of the final potato protein powder from 0.63 in the spray dried MF PFJ powder to 1.17 in PPC80. Table 5 also shows that ultrafiltration surprisingly increases the essential amino acid profile and the branched chain amino acid profile of the final protein powders.

TABLE 5

Typical compositions of native potato protein powders.

| Attribute | MF PFJ | Typical PPC70 | Typical PPC80 |
| --- | --- | --- | --- |
| Crude protein (% w/w TN × 6.25) | 52.4 | 70.1 | 80.0 |
| Non-protein nitrogen (% w/w NPN × 6.25) | 36.8 | 18.5 | 9.2 |
| Free amino acids (% w/w) | 31.1 | 9.9 | 6.2 |

TABLE 5-continued

Typical compositions of native potato protein powders.

| Attribute | MF PFJ | Typical PPC70 | Typical PPC80 |
|---|---|---|---|
| Total Dietary Fibre (% w/w) | 1.7 | 3.7 | 5.2 |
| Sugars (% w/w) | 9.0 | 3.3 | 2.3 |
| Starch (% w/w) | 0.0 | 0.1 | 0.1 |
| Ash (% w/w) | 20.7 | 11.8 | 6.0 |
| Fat (% w/w) | 1.6 | 3.8 | 2.4 |
| Moisture (% w/w) | 4.0 | 4.0 | 4.0 |
| Essential amino acids (g/100 g amino acids) | 30.3 | ND | 49.7 |
| Branched chain amino acids (g/100 g AA) | 11.9 | ND | 20.5 |
| Amino Acid Score (AAS) | 0.63 | ND | 1.17 |

ND = Not Determined,
AA = Amino Acids,
AAS = Amino Acid Score

Those skilled in the art would appreciate how ultrafiltration retention coefficients obtained under one set of operating conditions can be used to model compositions obtained under different operating conditions. Table 6 shows the modelled compositions of PPC70, PPC80 and PPI (potato protein isolate) containing at least 90% protein on a moisture-free basis) based on the process illustrated in FIG. 2 and the typical MF PFJ (ultrafiltration feed) composition.

Table 6 shows the expected composition and nutritional profile of a PPI produced using the process illustrated in FIG. 2. Table 6 also illustrates how modification of the ultrafiltration conditions in the manufacture of both native and microparticulated potato protein powders, as illustrated in FIG. 2 and FIG. 1 respectively can be used to tailor the composition of the powder to the nutritional requirements of the food and beverage products in which they are to be used.

TABLE 6

Modelled composition of native potato protein powders.

| Attribute | PPC70 | PPC80 | PPI |
|---|---|---|---|
| Crude protein (% w/w TN × 6.25) | 70.3 | 80.3 | 88.1 |
| Non-protein nitrogen (% w/w NPN × 6.25) | 16.4 | 8.6 | 2.4 |
| Free amino acids (% w/w) | 13.8 | 7.3 | 2.0 |
| Total Dietary Fibre (% w/w) | 4.0 | 3.4 | 3.1 |
| Sugars (% w/w) | 3.9 | 2.0 | 0.6 |
| Starch (% w/w) | 0.1 | 0.1 | 0.1 |
| Ash (% w/w) | 9.7 | 5.1 | 1.5 |
| Fat (% w/w) | 3.2 | 2.4 | 1.9 |
| Moisture (% w/w) | 4.0 | 4.0 | 4.0 |
| Essential amino acids (g/100 g amino acids) | 45.9 | 48.7 | 50.4 |
| Branched chain amino acids (g/100 g AA) | 18.7 | 20.0 | 20.7 |
| Amino Acid Score (AAS) | 1.13 | 1.17 | 1.19 |

Example 8. Demineralized Potato Protein Powder Production

Figure 3:
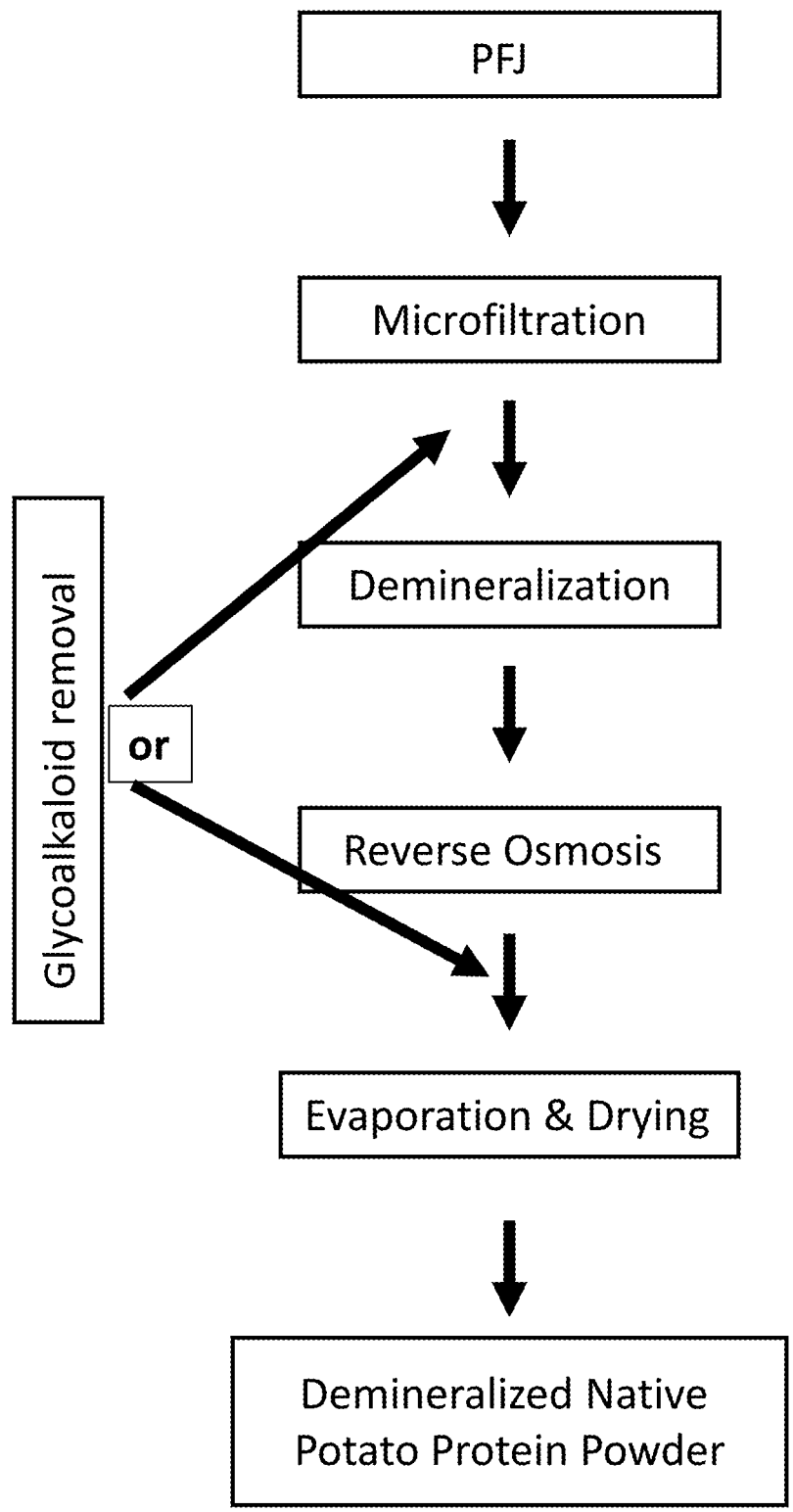
FIG. 3 is a flow diagram of the method of production of demineralized native potato protein powder. The PFJ in this flow diagram is clarified potato fruit juice.
Figure 4:
FIG. 4A and FIG. 4B show the wettability of different protein powders.
Figure 5:
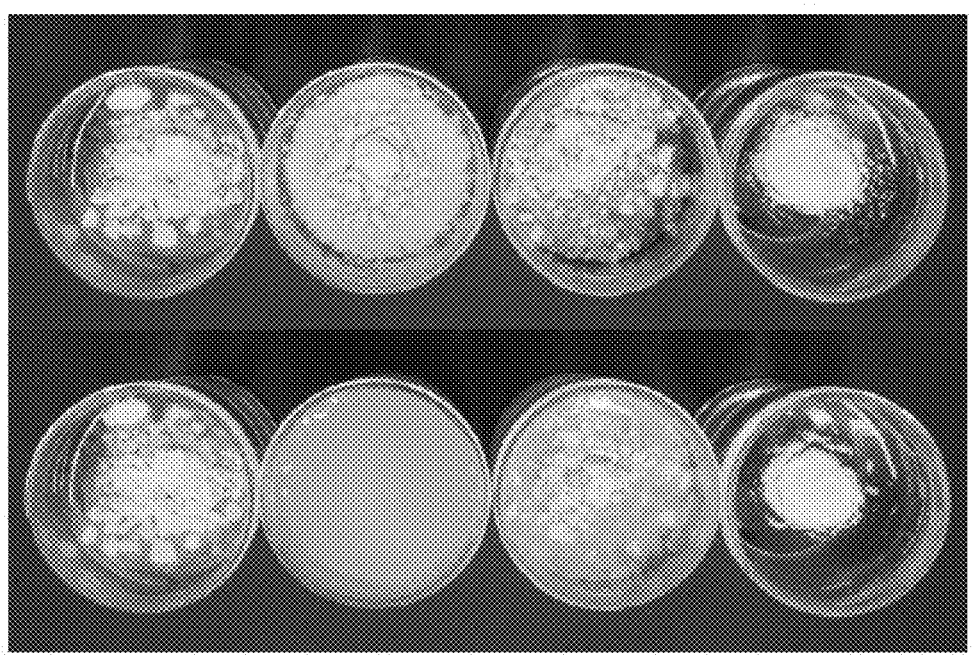
FIG. 5A and FIG. 5B show the wettability of different protein powders.

If a demineralized potato protein powder is contemplated, then the process for preparing a native potato protein powder is modified. Specifically, the permeate collected from the microfiltration step is demineralized using ion exchange resins. In this process, the flow through from the demineralization step is collected and concentrated using reverse osmosis (RO). Glycoalkaloids are removed essentially as described in Example 4 from either the microfiltration permeate, or from the concentrate recovered from reverse osmosis. The resulting fluid is evaporated and dried using methods known by one skilled in the art to produce total native potato protein powder. This process is illustrated with the flow chart presented as FIG. 3.

Example 9. Native and Microparticulated Potato Protein Powder Production and Analysis Potatoes were washed, abrasively peeled and then milled twice in the presence of approximately 2 mmol/kg of potassium metabisulfite using a Marchisio Mini Mixer (Fratelli Marchisio S.p.A, Pieve Di Teco, Italy). The potato slurry was then pressed using an LT20 water press (Viniquip International Ltd, Havelock North, New Zealand) and the recovered potato fruit juice (PFJ) left overnight at 5° C. to allow residual starch to settle. The following morning the PFJ was decanted away from the settled starch and microfiltered using 1.4 micron Membralox® ceramic membranes (Pall Corporation, Port Washington, NY). The PFJ microfiltration permeate was then ultrafiltered using a Synder® polyethersulfone (PES) MT ultrafiltration membrane with a pore size of 5 kDa (Synder Filtration, Vacaville, CA) to a volume concentration factor (VCF) of approximately 20 and the ultrafiltration (UF) retentate passed through an adsorptive resin to remove alkaloids. The alkaloid-reduced ultrafiltration retentate was spray dried using a Niro compact dryer with integral fluid bed 30 l/h water removal capacity (GEA Niro A/S, Soeborg, Denmark) to produce a native potato protein powder containing 80.8% crude protein (PPC80).

The UF retentate or the reconstituted native potato protein powder in water to a total solids concentration of 16.9 wt. % was recirculated through a 12 inch APV Cavitator (SPX Flow Technology, Silkeborg, Denmark) operated at 55 Hz and a feed flow rate of approximately 2500 L/h until the UF retentate or reconstituted potato protein stream had reached 85° C. The cavitated potato protein stream was then held at 85° C. for 5 min, cooled to 20-25° C. and homogenized at 300/50 bar using an APV Rannie LAB model 12.50H homogenizer (Rannie, Copenhagen, Denmark). The microparticulated potato protein stream was spray dried using a Niro compact dryer (GEA Niro A/S, Soeborg, Denmark) to produce a microparticulated potato protein powder containing 79.2% crude protein (MP PPC80). Particle size was determined by the Malvern method with a Mastersizer 3000 instrument (Malvern Instruments Ltd, Worcestershire, UK). Wettability and dispersibility of the potato protein powders can be determined by modification of methods by Augustin & Clarke (2011), ibid), Touhy (1989), ibid) and (AOAC Official Method 990.19 (1989)). Table 7 summarizes the composition and amino acid scores of the native (one sample) and functionalized, microparticulated (average of 4 samples) potato protein powders.

TABLE 7

Analysis of microparticulated and native potato protein concentrates.

| Attribute | Microparticulated PPC80 (4 samples) | Native PPC80 |
|---|---|---|
| Crude protein (% w/w) | 79.8 | 80.8 |
| True protein (% w/w) | 69.2 | 70.3 |
| Free amino acids (% w/w) | 7.4 | 8.3 |
| Total Dietary Fibre (% w/w) | 5.8 | 6.5 |
| Sugars (% w/w) | 3.6 | 1.8 |
| Starch (% w/w) | 0.1 | 0.1 |
| Fat (% w/w) | 2.3 | 2.7 |
| Ash (% w/w) | 5.4 | 5.5 |
| Moisture (% w/w) | 5.1 | 3.4 |
| Essential amino acids (% w/w) | 49.8 | 50.0 |
| Branched chain amino acids (% w/w) | 20.5 | 20.8 |
| Amino Acid Score (AAS) | 1.2 | 1.0 |

TABLE 7-continued

Analysis of microparticulated and native potato protein concentrates.

| Attribute | Microparticulated PPC80 (4 samples) | Native PPC80 |
|---|---|---|
| Wettability | 2 minutes | >60 minutes |
| Dispersibility | 92% | 38% |
| Particle size D [4.3] | 15-21 µm | 3 µm |

Table 8 summarizes the average amino acid compositions (mg/g crude protein) of functionalized, microparticulated potato protein powder (average of 4 samples) (PPC80) and native potato protein powder (average of 3 samples) (Native PPC80). Table 8 also includes the essential amino acid requirements for a preschool child, which is the reference protein for the Food and Agriculture Organization/World Health Organization (1991) Protein quality evaluation in human diets. FAO Food and Nutrition Paper 51. FAO, Rome. The essential amino acid values for cysteine and methionine are added together in order to calculate the AAS, as are those for phenylalanine and tyrosine. Isoleucine, leucine and valine are added together to determine the percentage of branched chain amino acids. About half of the amino acids are essential and half are nonessential. The amino acid score is calculated by determining the limiting essential amino acid and dividing by the reference amount of that same amino acid for the preschool child. For example, tryptophan is the limiting amino acid (13 mg/g crude protein) for the potato protein powders, which divided by tryptophan for the preschool child (11 mg/g crude protein), gives an amino acid score (AAS) of 1.2.

TABLE 8

Amino acid values (mg/g crude protein) of microparticulated and native potato protein compared to the essential amino acid requirement for the preschool child.

| | Microparticulated PPC80 (4 samples) | Native PPC80 (3 samples) | Essential Amino Acid Requirement |
|---|---|---|---|
| Essential Amino Acids | | | |
| Isoleucine | 48 | 49 | 28 |
| Leucine | 91 | 91 | 66 |
| Lysine | 74 | 74 | 58 |
| Cysteine | 19 | 22 | 25 |
| Methionine | 20 | 19 | |
| Phenylalanine | 57 | 57 | 63 |
| Tyrosine | 55 | 55 | |
| Threonine | 54 | 52 | 34 |
| Tryptophan | 14 | 13 | 11 |
| Valine | 66 | 68 | 35 |
| % Essential amino acids | 49.8 | 49.9 | |
| % Branched chain amino acids | 20.5 | 20.7 | |
| Amino Acid Score (AAS) | 1.3 | 1.2 | |
| Nonessential amino acids | | | |
| Alanine | 41 | 41 | |
| Arginine | 48 | 50 | |
| Aspartic acid | 136 | 137 | |
| Glutamic acid | 109 | 108 | |
| Glycine | 48 | 47 | |
| Histidine | 21 | 21 | |

TABLE 8-continued

Amino acid values (mg/g crude protein) of microparticulated and native potato protein compared to the essential amino acid requirement for the preschool child.

| | Microparticulated PPC80 (4 samples) | Native PPC80 (3 samples) | Essential Amino Acid Requirement |
|---|---|---|---|
| Proline | 50 | 50 | |
| Serine | 50 | 48 | |
| % Nonessential amino acids | 50.2 | 50.1 | |

Example 10. Determination of Wettability and Dispersibility

The following protocol was used to determine the functional properties of wettability and dispersibility of the potato protein powders described in this specification. The protocol was adapted from Augustin & Clarke. (2011), ibid, Touhy (1989), ibid and AOAC Official Method 990.19 (1989).

The crude protein content of each protein sample was determined. For the potato protein powders, the crude protein content for each batch was approximately 80%. To determine wettability, a 5% aqueous protein dispersion was targeted. The mass of protein to be added to reverse osmosis (RO) water was calculated to produce a final total mass of 200 g. The water (at 20° C.) was weighed into an 800 ml beaker, and the powder sample was added to the water surface over 2 seconds. A stopwatch was simultaneously started with the addition of the powder sample to the surface of the water. The time for all of the powder to sink below the surface of the water was recorded. Three replicate trials were conducted for each powder sample.

To determine dispersibility, a 5% aqueous protein dispersion was targeted. The mass of protein to be added to RO water was calculated to produce a final total mass of 200 g. The water (at 20° C.) was weighed into a 400 ml beaker with a stir bar, and the water stirred at 800 RPM using a magnetic stir plate. The powder sample was added over 2 seconds with stirring. A stopwatch was simultaneously started with the addition of the powder sample to the water. The dispersion was mixed for 1 minute, the stirring stopped, and a sample of the dispersion was drawn for use to determine dispersed solids using the oven drying method AOAC 990.19. Three replicate trials were conducted for each powder sample.

A. Potato Protein Powders: Sample Set A

The native potato protein powder was produced according to FIG. 2. The microparticulated potato protein powder was produced according to FIG. 1. The other protein powders were pea protein concentrate (80% protein, PEAP250, Marsanta Foods, Mt Wellington, New Zealand), whey protein concentrate (80% protein, ALACEN® 450, Fonterra, Auckland, New Zealand), soy protein isolate (87% protein, SUPRO®670, DuPont, Auckland, New Zealand), and whey protein isolate (94% protein, ALACEN® 895, Fonterra, Auckland, New Zealand). The analysis included wettability and dispersibility at 5% protein (Table 9) and wettability for 0.5% protein (FIGS. 4A-4B and FIGS. 5A-5B).

At 0.5% protein concentration the measured wettability of the sample set A microparticulated potato protein powder was 95 seconds (sample 2 in each of FIG. 4A, FIG. 4B, FIG. 5A, and FIG. 5B). The native potato protein, soy protein isolate, and whey isolate protein powders did not sink below the surface of the water within 60 minutes (FIGS. 4A-4B and FIGS. 5A-5B).

At 5% protein concentration, the measured wettability of the sample set 'A' microparticulated potato protein was 2 minutes compared with 15 minutes for the pea protein and more than an hour for the instantized whey protein concentrate (ALACEN® 450), soy protein isolate and native potato protein powders (Table 9). The excellent wettability of the sample set 'A' microparticulated potato protein powder is surprising given that these powders, unlike ALACEN® 450, were not coated with lecithin (a surfactant) in order to help break the surface tension of the water.

A total of 92% of the total solids were dispersed for the sample set 'A' microparticulated potato protein powder compared with 80% for the soy protein isolate, 86% for the pea protein, 95% for the instantized whey protein concentrate and 38% for the native potato protein powders (Table 9). The sample set 'A' microparticulated potato protein powder had excellent dispersibility.

TABLE 9

Wettability and dispersibility of 5% protein powders in water.

| Protein Powder | Wettability (minutes) | Dispersibility (% of total solids) |
| --- | --- | --- |
| Microparticulated Potato Protein Powder (sample set A) | 2 | 92% |
| Pea Protein Powder | 15 | 86% |
| Whey Protein Concentrate Powder | >60 | 95% |
| Soy Protein Isolate Powder | >60 | 80% |
| Native Potato Protein Powder | >60 | 38% |

B. Potato Protein Powders: Sample Set B

Wettability and dispersibility of sample set 'B' native and microparticulated powders were compared with soy protein isolate (86% protein, Herbal Secrets Organic Soy Isolate, Jersey City, NJ, USA), pea protein isolate (76% protein, Pea Protein Isolate, Farbest Brands, Montvale, NJ, USA), Innovix potato protein (90% protein Innovix Pharma Inc., Calabasas, CA, USA) and Solanic 200 potato protein (90% protein, Solanic 200, Mid-American Food Sales Ltd., Northbrook, IL, USA).

The sample set 'B' microparticulated potato protein powder demonstrated rapid wettability at 4 minutes, where all of the other powders did not wet by 60 minutes (Table 10).

The sample set 'B' microparticulated powders also demonstrated greater dispersibility (90%) than the pea and soy (89%) powders, the Innovix potato protein (85%) and the Solanic potato protein powder (83%). The sample set 'B' native potato protein had the lowest dispersibility (63%).

TABLE 10

Wettability and dispersibility of 5% protein powders in water

| Protein Powder | Wettability (Minutes) | Dispersibility (% of total solids) |
| --- | --- | --- |
| Microparticulated Potato Protein Powder (Sample set B) | 4 | 90% |
| Pea Protein Powder | >60 | 89% |
| Solanic 200 Potato Protein Powder | >60 | 83% |
| Innovix Potato Protein Powder | >60 | 85% |
| Soy Protein Isolate Powder | >60 | 89% |
| Native Potato Protein Powder | >60 | 63% |

Example 11. Protein Powder Flavor/Sensory Testing

Panels of professionally trained individuals can be used to evaluate food products for sensory characteristics such as appearance, flavor, aroma, and texture. Prior to evaluation, panelists would be trained for instance in the 15-point Universal Intensity Scale, on the following attributes: bitterness, sourness, astringency, chemical aroma, musty aroma, green aroma, cheesy aroma, cooked potato aroma, animalic aroma, and beany aroma. Samples would be prepared according to crude protein concentration, and presented to the panelists at room temperature. The samples would be evaluated blind, monadic sequential, in duplicate, and in random order.

Food and beverages would be prepared with either the native potato protein powder, or the microparticulated potato protein powder. Control samples would be prepared without a potato protein powder. These would be presented to the trained sensory panel for evaluation of attributes of appearance, flavor, aroma, and texture. The samples would be evaluated blind, monadic sequential, in replicate, and in random order.

Example 12. Preparation of Vegan Yogurt

Plant protein powder, almond milk (Unsweetened, Blue Diamond Almonds, Sacramento, CA) and sugar were mixed together to form a yogurt base and heated to 82° C. In the instance of the control vegan yogurt, no additional protein was added and the balance of the mass was almond milk. With the other three vegan yogurts, the plant protein powder was one of the following: pea with a protein concentration of 76% (Farbest, Park Ridge, NJ), the native potato protein powder with a protein concentration of 77% (J. R. Simplot Company, Boise, ID), or soy with a protein concentration of 86% (Herbal Secrets, Jersey City, NJ). The calculated final protein concentration of each of the yogurts is 5%. See Table 11 for composition for each of the plant (aka vegan) protein yogurt base mixtures. The yogurt base was cooled to 46° C., then homogenized in a high-speed blender. The homogenized yogurt base (130 g) was added to a 4 oz glass jar containing 0.10 gram of yogurt culture (Vegan Real Yogurt, Cultures for Health, Raleigh, NC). The yogurts were incubated in a water bath at 43° C. The pH and temperature of the yogurt was monitored each hour until the pH dropped below 4.5, or up to 10 hours of incubation when the incubation was stopped). pH drop below 4.5 was 9 hours for potato protein and pea protein, 10 hours for soy protein, and no added protein did not complete by the time limit of 10 hours.

The yogurts were refrigerated for 24 hours after the completion of the fermentation process. FIG. 6 shows the syneresis (separation of water) in the refrigerated, fermented vegan protein yogurts. The arrow pointing at the bright bands shows the separation of water from the gel-like structure of the fermented product. With the separation of water, the yogurts had a visible grainy, curd-like structure. There was an absence of undesirable syneresis observable in the yogurt prepared with the native potato protein powder.

TABLE 11

Composition of yogurt prepared with pea protein, potato protein, or soy protein powder.

|  | Plant protein powder source | | | |
|---|---|---|---|---|
|  | No Added Protein | Pea | Native Potato | Soy |
| Protein Ingredient Crude Protein Content (%) | 0.00 | 76% | 77% | 86% |
| Powder for 5% Protein Dispersion (g) | 0.0 | 91.8 | 90.9 | 81.3 |
| Unsweetened Almond Milk (g) | 1259.9 | 1168.1 | 1169.2 | 1178.7 |
| Sugar (g) | 140.0 | 140.0 | 140.0 | 140.0 |
| Yogurt Mixture per Jar (g) | 130.0 | 130.0 | 130.0 | 130.0 |
| Yogurt Culture per Jar (g) | 0.1 | 0.1 | 0.1 | 0.1 |
| Total mass (g) | 1400.0 | 1400.0 | 1400.0 | 1400.0 |

Example 13. Preparation of Sports Bar

The protein powder, sieved cocoa powder (ADM D-11-DL, Hawkins Watts, Auckland, New Zealand), sweeteners (stevia, TASTEVA and sucralose, SPLENDA, Tate & Lyle, Auckland, New Zealand) and flavor powders (Chocolate flavor JBS-704, Flavorjen, Chemiplas, Auckland New Zealand and Vanilla flavor VP-5821, Flavorjen, Chemiplas, Auckland, New Zealand) were mixed together. High oleic canola oil (Bakels Edible Oils, Omanu, New Zealand) and soy lecithin (SOLEC 162, DuPont Nutrition & Health, Auckland, New Zealand) were mixed together and then blended into the powder mixture using a Kenwood Cooking Chef Major Mixer (KM080) coupled with induction heating and the K-beater attachment for one minute while heating to 45-50° C. Glycerine (Food Grade, FCC, Sigma-Aldrich, Auckland, New Zealand), glucose syrup (A2150, New Zealand Starch, Auckland, New Zealand) and Litesse® Two syrup (70% polydextrose, DuPont Nutrition & Health, Auckland, New Zealand) was heated in a microwave (Sharp Carousel, Model R-331Y(s) 1100W) on high power for 20 seconds, mixed well, and added to the bar dough. The dough was mixed for 2 minutes and then rolled onto a chopping board and rested for 30 minutes. The dough was cut into bars 10×3×1.5 cm. With the six sports bars, the protein powder was one of the following: sample set 'A' microparticulated potato protein with a protein concentration of 78%, Solanic 200 potato protein (90% protein, Solanic 200, Mid-American Food Sales Ltd., Northbrook, IL, USA), Solanic 300 potato protein (93% protein, Solanic 200, Mid-American Food Sales Ltd., Northbrook, IL, USA), soy protein isolate blend (87% protein, SUPRO®320 and SUPRO®670, DuPont, Auckland, New Zealand), or whey protein isolate (94% protein, ALACEN® 895, Fonterra, Auckland, New Zealand). The calculated final protein concentration of each of the sports bars is 25%. See Table 12 for the compositions of each of the sports bars. The bars were formulated to contain 25% protein and a very similar composition by varying the percentages of protein powder and other ingredients added. The higher potassium in the microparticulated potato protein is evident in the bar containing this protein compared to the bars containing the other proteins (see Table 12).

Figure 7:
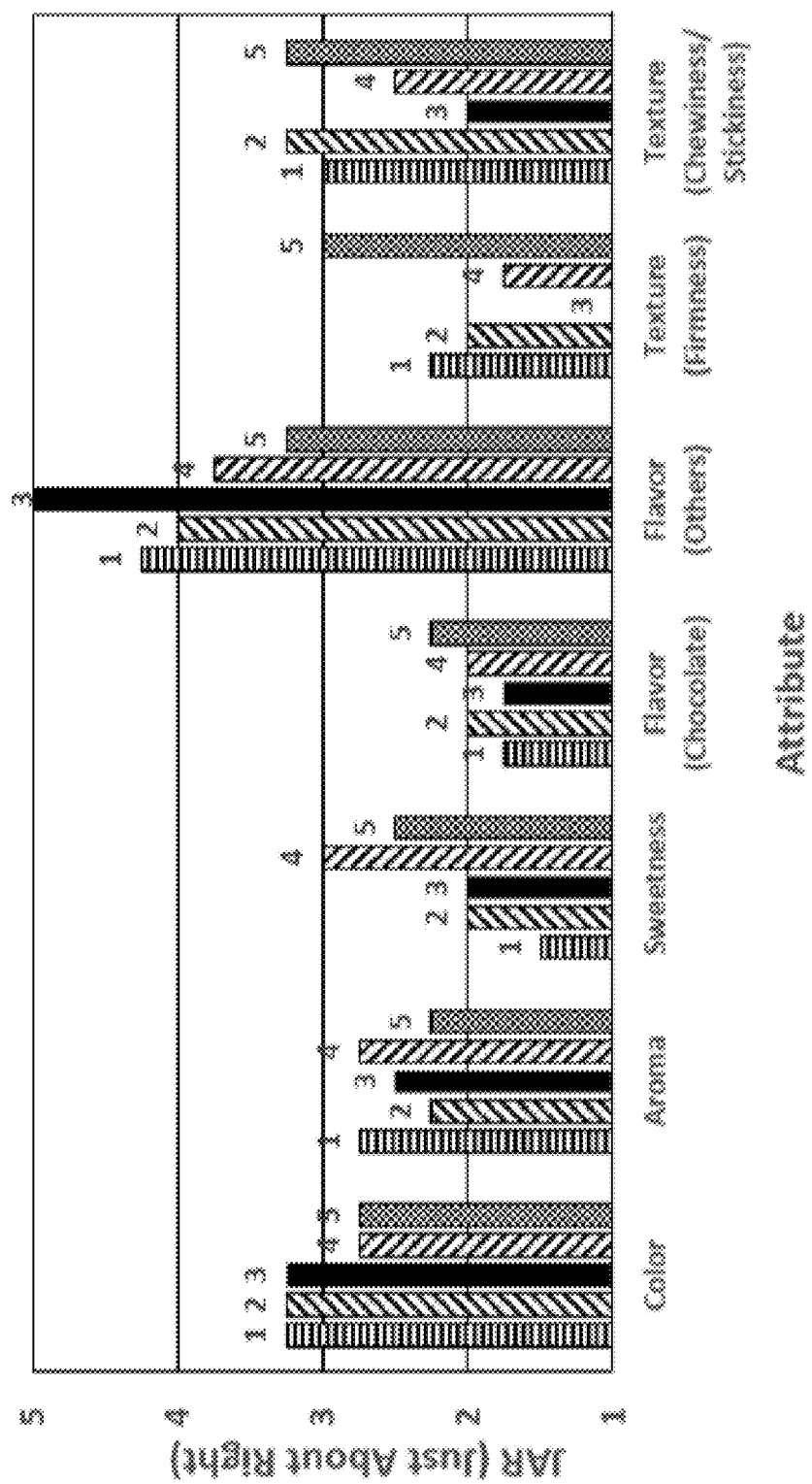
FIG. 7 shows the JAR (Just About Right) mean sensory scores for attributes of color, aroma, sweetness, flavor (chocolate), flavor (others), texture (firmness) and texture (chewiness/stickiness) for the sports bars prepared with different protein powders. A JAR score of 3 equal to Just About Right, 1 equal to too low or not enough, and 5 equal to too high or too much. The calculated final protein concentration of each of the sports bars is 25%. The sports bars were prepared with the following protein powders: 1—microparticulated potato protein; 2—Solanic 200 Potato Protein; 3—Solanic 300 Potato Protein; 4—soy protein; 5—whey protein.

The sports bars were presented to food technologists experienced in tasting sports bars for evaluation of color, aroma, sweetness, flavor (chocolate), flavor (other), texture (firmness) and texture (chewiness/stickiness) fresh within one week of making the bars. The samples were evaluated blind in random order using a five-point Just About Right (JAR) scale (1-5), with 3 equal to Just About Right, 1 equal to too low or not enough, and 5 equal to too high or too much (Rothman L, 2009. The Mean. In Rothman L, Parker MH eds. Just About Right (JAR) Scales: Design, Usage, Benefits, and Risks. ASTM Manual, MNL 63 International, Bridgeport, NJ). The microparticulated potato protein bar had good initial texture for firmness and chewiness compared with Solanic 300, which did not form a bar and had an objectionable other flavor described as very chemical, metallic, astringent, bitter, totally unacceptable with a score of 5. Table 13 and FIG. 7 compare the JAR mean scores for the ambient-stored sports bars.

TABLE 12

Composition of sports bars prepared with different protein powders.

|  | Protein powder source | | | | |
|---|---|---|---|---|---|
| Composition | Microparticulated potato protein | Solanic 200 potato protein | Solanic 300 potato protein | Soy protein | Whey protein |
| Protein (%) | 25.0 | 25.0 | 25.0 | 25.0 | 25.0 |
| Fat, Total (%) | 11.1 | 10.1 | 10.1 | 10.0 | 10.0 |
| Saturated (%) | 2.1 | 1.5 | 1.5 | 1.6 | 1.5 |
| Carbohydrate (%) | 40.6 | 43.3 | 44.0 | 41.5 | 42.5 |
| Sugars (%) | 10.3 | 10.2 | 10.4 | 9.6 | 10.0 |
| Dietary Fiber (%) | 8.3 | 7.8 | 7.0 | 8.4 | 8.4 |
| Sodium (mg) | 102 | 343 | 53 | 351 | 185 |
| Potassium (mg) | 991 | 434 | 434 | 471 | 434 |

TABLE 13

Just-about-right (JAR) mean scores of sports bars prepared with different protein powders.

|  | Protein powder source | | | | |
|---|---|---|---|---|---|
| Attribute | Microparticulated potato protein | Solanic 200 potato protein | Solanic 300 potato protein | Soy protein | Whey protein |
| Color | 3.25 | 3.25 | 3.25 | 2.75 | 2.75 |
| Aroma | 2.75 | 2.25 | 2.50 | 2.75 | 2.25 |
| Sweetness | 1.50 | 2.00 | 2.00 | 3.00 | 2.50 |
| Flavor (Chocolate) | 1.75 | 2.00 | 1.75 | 2.00 | 2.25 |
| Flavor (Others) | 4.25 | 4.00 | 5.00 | 3.75 | 3.25 |
| Texture (Firmness) | 2.25 | 2.00 | 1.00 | 1.75 | 3.00 |
| Texture (Chewiness/ Stickiness) | 3.00 | 3.25 | 2.00 | 2.50 | 3.25 |

Example 14. Preparation of Dry Mix Beverage

Five dry mix beverages were prepared using five different protein powders: sample set 'A' microparticulated potato protein with a protein concentration of 78%, Solanic 200 potato protein (90% protein, Solanic 200, Mid-American Food Sales Ltd., Northbrook, IL, USA), Solanic 300 potato protein (93% protein, Solanic 200, Mid-American Food Sales Ltd., Northbrook, IL, USA), soy protein isolate (87% protein, SUPRO®670, DuPont, Auckland, New Zealand), or whey protein isolate (94% protein, ALACEN® 895, Fonterra, Auckland, New Zealand). For each dry mix beverage the protein powder and the following ingredients were weighed and mixed together: sieved cocoa powder (ADM D-11-DL, Hawkins Watts, Auckland, New Zealand), sweeteners (stevia, TASTEVA and sucralose, SPLENDA, Tate & Lyle, Auckland, New Zealand), flavor powders (Chocolate flavor JBS-704, Flavorjen, Chemiplas, Auckland, New Zealand and Vanilla flavor VP-5821, Flavorjen, Chemiplas, Auckland, New Zealand), maltodextrin (Clintose CR10, ADM/Hawkins Watts, Auckland, New Zealand), carrageenan (Lactarin MV 306, FMC/Hawkins Watts, Auckland, New Zealand), inulin (Synergy 1, Beneo-Orafti, Auckland, New Zealand) and beverage creamer (Coffee-Mate, Nestle, Countdown, Palmerston North, New Zealand). The calculated final protein concentration of each of the dry mix powders was 42%. The liquid beverage was prepared by mixing 36 grams of powder into 8 ounces of chilled water (236 grams) in a shaker bottle with a wire blending ball and shaking the bottle for about one minute before consumption within five minutes. The final protein content in the liquid beverage was 5.5 wt. % or 15 g in 8-ounces of water. See Table 14 for the composition for each of the dry mix beverage powders, which were formulated to be as close as possible based on using the same ingredients in each beverage. The higher potassium content in the dry mix beverage containing microparticulated potato protein is evident compared to the dry mix beverages containing the other proteins.

Figure 8:
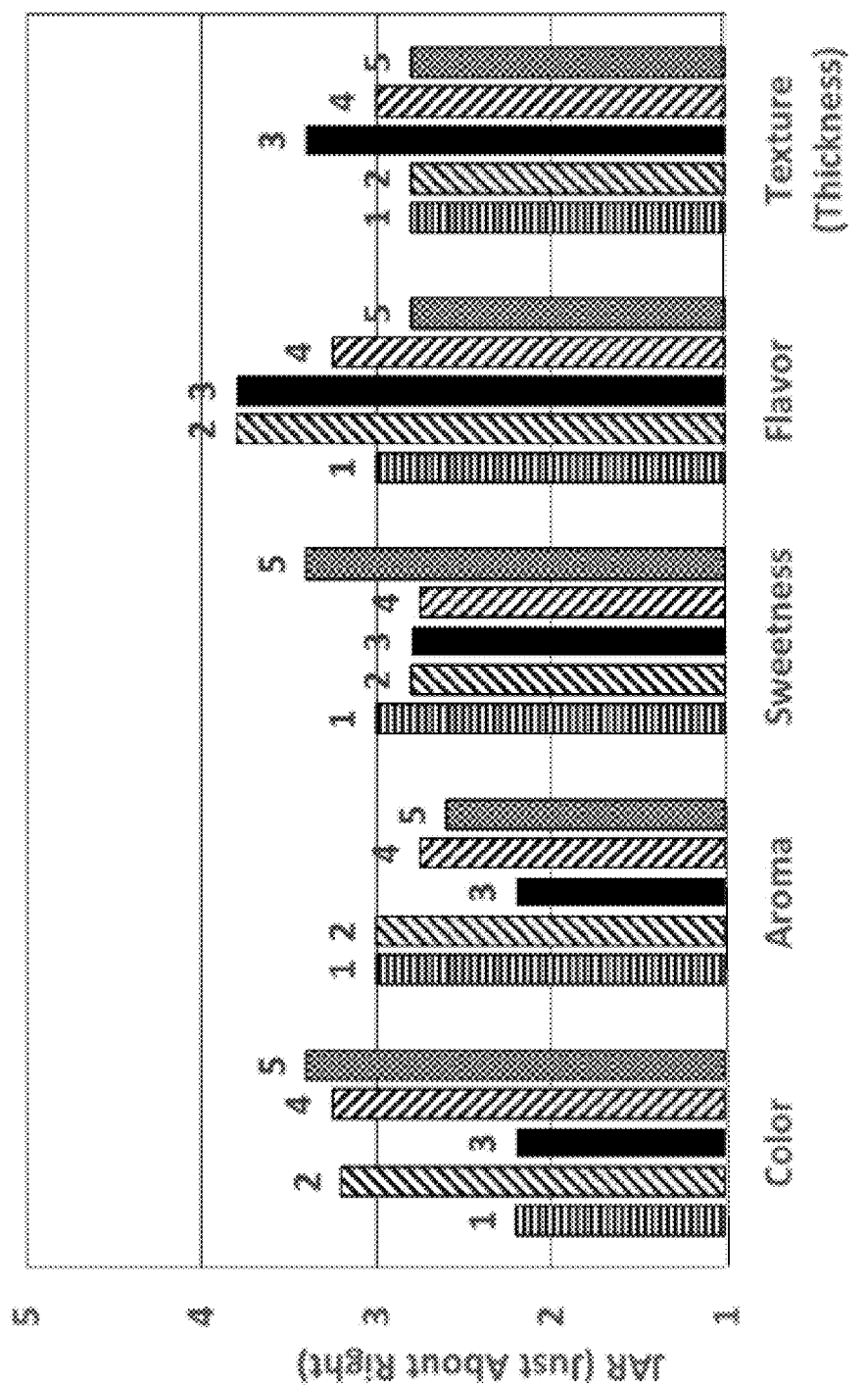
FIG. 8 shows the JAR (Just About Right) mean sensory scores for attributes of color, aroma, sweetness, flavor and texture (thickness) for the liquid beverages made from dry mix powders with differing protein source. A JAR score of 3 equal to Just About Right, 1 equal to too low or not enough, and 5 equal to too high or too much. The calculated final protein concentration of each of the dry mix beverages is 42%. The final concentration content of the final liquid beverage is wt. % 5.5 (15 g powder in 8-ounce water). The dry mix beverage powders were prepared with the following protein powders: 1—microparticulated potato protein; 2—Solanic 200 Potato Protein; 3—Solanic 300 Potato Protein; 4—soy protein; 5—whey protein.

The liquid beverages were presented to food technologists experienced in tasting beverages for evaluation of color, aroma, sweetness, flavor and texture (thickness). The samples were evaluated blind in random order using a five-point Just About Right (JAR) scales (1-5), with 3 equal to Just About Right, 1 equal to too low or not enough and 5 equal to too high or too much (Rothman L, 2009. The Mean. In Rothman L, Parker MH eds. Just About Right (JAR) Scales: Design, Usage, Benefits, and Risks. ASTM Manual, MNL 63 International, Bridgeport, NJ). The flavor attributes for the five liquid beverages were similar. However, there were comments that the Solanic 200 beverage had an unusual earthy, cardboard flavor whereas the Solanic 300 beverage had a sour astringent flavor. Table 15 and FIG. 8 compares the JAR mean scores for the liquid beverages.

TABLE 14

Composition of dry mix beverage powders prepared with different protein powders.

| | Protein powder source | | | | |
|---|---|---|---|---|---|
| Composition | Microparticulated potato protein | Solanic 200 potato protein | Solanic 300 potato protein | Soy protein | Whey protein |
| Protein (%) | 41.6 | 41.7 | 41.8 | 41.6 | 43.1 |
| Fat, Total (%) | 8.4 | 7.1 | 7.1 | 8.4 | 8.5 |
| Saturated (%) | 1.0 | 1.1 | 1.1 | 1.4 | 1.0 |
| Carbohydrate (%) | 26.7 | 32.6 | 33.7 | 31.5 | 31.5 |
| Sugars (%) | 6.7 | 4.5 | 4.6 | 4.4 | 5.2 |
| Dietary Fiber (%) | 13.7 | 15.6 | 14.2 | 14.0 | 8.5 |
| Sodium (mg) | 250 | 618 | 137 | 738 | 377 |
| Potassium (mg) | 1930 | 810 | 810 | 888 | 743 |

TABLE 15

Just-about-right (JAR) mean scores of dry mix beverages prepared with different protein powders.

| | Protein powder source | | | | |
|---|---|---|---|---|---|
| Attribute | Microparticulated potato protein | Solanic 200 potato protein | Solanic 300 potato protein | Soy protein | Whey protein |
| Color | 2.2 | 3.2 | 2.2 | 3.3 | 3.4 |
| Aroma | 3.0 | 3.0 | 2.2 | 2.8 | 2.6 |
| Sweetness | 3.0 | 2.8 | 2.8 | 2.8 | 3.4 |
| Flavor | 3.0 | 3.8 | 3.8 | 3.3 | 2.8 |
| Texture (Thickness) | 2.8 | 2.8 | 3.4 | 3.0 | 2.8 |

What is claimed is:

1. A potato protein powder comprising
   (a) crude protein extracted from potato fruit juice (PFJ) comprising:
      (i) about 65-about 91 wt. % crude protein;
      (ii) about 70-about 90 wt. % true protein; and
      (iii) about 1-about 30 wt. % free amino acids; and
   (b) about 1-about 20 wt. % ash from the PFJ;
wherein the potato protein powder has an amino-acid score that is equal to, or greater than 1 (AAS≥1).

2. The potato protein powder of claim 1, wherein the potato protein powder comprises a potassium level of about 10,000-about 20,000 ppm, or about 20,000-about 30,000 ppm, or about 30,000-about 40,000 ppm, or about 40,000-about 50,000 ppm, or about 50,000-about 60,000 ppm, or more than 60,000 ppm.

3. The potato protein powder of claim 1, wherein the potato protein powder comprises about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. %, about 76 wt. %, about 77 wt. %, about 78 wt. %, about 79 wt. %, about 80 wt. %, about 81 wt. %, about 82 wt. %, about 83 wt. %, about 84 wt. %, about 85 wt. %, about 86 wt. %, about 87 wt. %, about 88 wt. %, about 89 wt. %, or about 90 wt. %, to about 91 wt. % crude protein.

4. The potato protein powder of claim 1, wherein the potato protein powder comprises a total α-glycoalkaloid concentration is less than 300 ppm, or less than 200 ppm, or less than 100 ppm, or less than 75 ppm, or less than 50 ppm.

5. The potato protein powder of claim 1, wherein the potato protein powder comprises about 5-about 30 wt. % free amino acids.

6. The potato protein powder of claim 1, wherein the potato protein powder comprises about 80-about 90 wt. % true protein.

7. A fermented yogurt product comprising the potato protein powder of claim 1, wherein there is an absence of syneresis in the fermented yogurt product 24 hours after completion of the fermentation process.

8. A beverage comprising the potato protein powder of claim 1, wherein the beverage is a ready to drink beverage or a dry mix beverage.

9. A food comprising the potato protein powder of claim 1.

10. The food of claim 9, wherein the food is selected from the group consisting of: an extruded bar, a sports bar, a baked bar, a plant-based meat analog, a ready to eat meal, a dehydrated food, a shelf-stable food, a frozen food, a fermented food, a non-dairy vegan food, and a pet food.

11. A food or beverage comprising a potato protein powder, wherein the potato protein powder comprises:
   (a) crude protein extracted from potato fruit juice (PFJ) comprising:
      (i) about 70-about 90 wt. % true protein; and
      (ii) about 1-about 30 wt. % free amino acids; and
   (b) about 1-about 20 wt. % ash from the PFJ;
wherein the potato protein powder has an amino-acid score that is equal to, or greater than 1 (AAS≥1).

12. The food or beverage of claim 11, wherein the potato protein powder comprises a potassium level of between about 10,000 and about 60,000 ppm.

13. The food or beverage of claim 11, wherein the potato protein powder comprises about 65-91 wt. %, crude protein.

14. The food or beverage of claim 11, wherein the potato protein powder comprises a total α-glycoalkaloid concentration is less than 300 ppm, or less than 200 ppm, or less than 100 ppm, or less than 75 ppm, or less than 50 ppm.

15. The food or beverage of claim 11, wherein the potato protein powder comprises about 5-about 30 wt. % free amino acids.

16. The food or beverage of claim 11, wherein the potato protein powder comprises about 80-about 90 wt. % true protein.

17. The food or beverage of claim 11, wherein the food is a fermented food.

18. The fermented food of claim 17, wherein the fermented food is a yogurt product and there is an absence of syneresis in the yogurt product 24 hours after completion of the fermentation process.

19. The food or beverage of claim 11, wherein the beverage is a ready to drink beverage or a dry mix beverage.

20. The food or beverage of claim 11, wherein the food is selected from the group consisting of: an extruded bar, a sports bar, a baked bar, a plant-based meat analog, a ready to eat meal, a dehydrated food, a shelf-stable food, a frozen food, a non-dairy vegan food, and a pet food.

* * * * *